US007646197B2

(12) United States Patent
Misaka et al.

(10) Patent No.: US 7,646,197 B2
(45) Date of Patent: Jan. 12, 2010

(54) SEMICONDUCTOR INTEGRATED CIRCUIT DEVICE AND POWER CONSUMPTION CONTROL DEVICE

(75) Inventors: Satoshi Misaka, Kokubunji (JP); Makoto Saen, Kodaira (JP); Tetsuya Yamada, Sagamihara (JP); Keisuke Toyama, Yokohama (JP); Kenichi Osada, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 630 days.

(21) Appl. No.: 11/542,133

(22) Filed: Oct. 4, 2006

(65) Prior Publication Data
US 2007/0083779 A1  Apr. 12, 2007

(30) Foreign Application Priority Data
Oct. 7, 2005  (JP) ............................. 2005-294757

(51) Int. Cl.
G01V 3/00  (2006.01)
(52) U.S. Cl. ..................................................... 324/300
(58) Field of Classification Search ......... 324/300–322; 365/226, 227; 713/300, 320; 275/130; 327/544; 375/316
See application file for complete search history.

(56) References Cited
U.S. PATENT DOCUMENTS
6,934,210 B2 * 8/2005 Akiba et al. ................ 365/222

7,088,636 B2 * 8/2006 Akiba et al. ................ 365/226
7,292,496 B2 * 11/2007 Akiba et al. ................ 365/226
2008/0253215 A1 * 10/2008 Akiba et al. ................ 365/227
2008/0307240 A1 * 12/2008 Dahan et al. ................ 713/320
2009/0168843 A1 * 7/2009 Waters et al. ............... 375/130

FOREIGN PATENT DOCUMENTS
JP      8-152945       6/1996

* cited by examiner

Primary Examiner—Brij B Shrivastav
(74) Attorney, Agent, or Firm—Miles & Stockbridge P.C.

(57) ABSTRACT

To perform execution scheduling of function blocks so as to control the total required power of the function blocks within a supplyable power budget value, and thereby realize stable operations at low power consumption. Function block identifiers are allotted to all the function blocks, and to a RAM area that a power consumption control device can read and write, a list to store identifiers and task priority, power mode value showing power states, and power mode time showing the holding time of power states can be linked. A single or plural link lists for controlling the schedules of tasks operating on the function blocks, a link list for controlling the function block in execution currently in high power mode, a link list for controlling the function block in stop currently in stop mode, and a link list for controlling the function block in execution currently in low power mode are allotted, and thereby the power source and the operation clock are controlled by the power consumption control device.

17 Claims, 16 Drawing Sheets

SEMICONDUCTOR INTEGRATED CIRCUIT DEVICE AND POWER CONSUMPTION CONTROL DEVICE

CROSS-REFERENCE TO RELATED APPLICATION

The present application claims priority from Japanese Patent Application No. JP 2005-294757 filed on Oct. 7, 2005, the content of which is hereby incorporated by reference into this application.

TECHNICAL FIELD OF THE INVENTION

The present invention relates to a low power consumption technology in a semiconductor integrated circuit device, more specifically to a technology effective for power consumption control in the functional block in the semiconductor integrated circuit device.

BACKGROUND OF THE INVENTION

In recent years, digital household electric appliances including battery-driven types such as cell phones, digital cameras, portable audio players and the like, and stationary types such as digital TV sets, digital video disk players, digital hard disk recorders and the like have become compact, thin and light-weight, and semiconductor integrated circuit devices such as digital LSI (Large Scale Integration) and the like have been used widely.

Semiconductor microfabrication technologies to manufacture digital LSI have been developed more year after year, and for example by making the gate width and oxide file thickness and the like of a CMOS (Complementary Metal Oxide Semiconductor) circuit thinner, it has been possible to manufacture the digital LSI itself thinner and smaller. The compact and thin and light-weight structure of the digital LSI is regarded as the value of semiconductor.

Further, in order to make the gate width and the oxide film thickness thin, it is necessary to make the power source voltage to be applied to the digital LSI low at the same time. As a result, in order to secure the same processing capacity or more than that of digital LSI produced by the one generation prior microfabrication technology, that is, to produce digital LSI that can be driven at the same operation frequency or more, from the relation between withstand voltage and the oxide film thickness, it is necessary to make the power source voltage low, and at the same time to make the threshold value voltage lower than that of the digital LSI.

However, when the threshold voltage is made low, whether the digital LSI is driven or not, that is, whether the CMOS circuit is switched or not, the increase of leakage current which has the characteristic that as long as the power source voltage is applied, current leaks and energy is consumed unintentionally becomes prominent.

In the years before 2000, the switching current having the characteristic that energy is consumed when the CMOS circuit is actually driven occupied the large portion of the entire power consumption. However, it is forecasted that after the year 2000, along with the progress of microfabrication technologies, the ratio of energy consumption by leakage current will become dominant exponentially.

Therefore, the trend goes to the phase not to realize a digital LSI of the same processing capacity or more than that of the digital LSI by making the power source voltage low, and making the operation frequency high, but to realize a digital LSI by not setting the power source voltage as low as possible, that is, by preventing the decline of the threshold value voltage, and driving similar plural processing mechanisms in parallel.

For example, it is not to realize a high speed processor, but to realize a mixed loading chip of plural processors and ASIC (Application Specific Integrated Circuit) that can operate in parallel.

The above consideration helps prevention of the exponential increase of the leakage current, and easily realizes the compact and thin and light-weight structure of digital LSI that is regarded as the value of semiconductors, by microfabrication technologies.

Further, when the compact and thin and light-weight structure of digital LSI is realized, products are differentiated with the same chip area as that of the digital LSI, and by adding further processing functions, therefore, loading more plural processors and ASIC that can perform parallel processing than the mixed loading chip, that is, integration is performed consequently.

However, in integration, the number of transistors showing the CMOS circuit scale per unit chip area increases, the LSI gets to have a large load capacity, and the power consumption by switching current increases. It is forecasted that around the year 2010, the number of processors and ASIC loaded per one chip will be several ten to one hundred, and the power source voltage will become saturated while become low, on the contrary, the consumption current as the sum of the switching current and the leakage current will be increasing in proportion to the number of processors and ASIC loaded per one chip.

There are occurring two main problems to be solved in the low voltage and large current age in the future, arising from microfabrication and integration of digital LSI. One is the heat design power problem to occur with the digital LSI itself becoming a heat generation source, and the other is the electromagnetic noise countermeasure problem to occur with the digital LSI itself becoming an electromagnetic noise generation source.

The thermal design power problem is the problem in designing the package of digital LSI by use of heat calculation equation. Whether the digital LSI is driving or not, consumed power is converted into heat in accordance to the amount of current consumed, and increases the temperature of digital LSI itself.

In the chip temperature, there exists a temperature range to guarantee proper operation, and when the temperature range is exceeded, digital LSI sees malfunction, and in the worst case, the CMOS circuit is broken and operations cannot be made. In the personal computer and the like, a cooling fan is arranged at the vicinity of LSI, and thereby chip temperature increase is prevented.

However, the cooling fan causes noise, therefore, it is not desired to package the cooling fan to digital household electric appliances. Further, there is a case where a route to dissipate heat such as a heat sink or the like is arranged in package, thereby the chip temperature increase is prevented.

In the future, when microfabrication and integration are applied to digital LSI, the consumption current will increase and the chip temperature will increase, and there is a fear that the chip temperature may exceed the range of the temperature to guarantee proper operation.

Further, the electromagnetic noise countermeasure issue is the problem concerning the system design of entire semiconductor integrated circuit device from digital LSI to a board on which the digital LSI is loaded. The electromagnetic noise is the total value of the value of DC component voltage of consumption current occurring by resistance components of entire power source wiring circuit including digital LSI and battery loaded on the board, and the value of AC component voltage change of consumption current occurring by inductance components formed in the entire power source wiring circuit.

The value of the DC component voltage corresponds to the product IR of the resistance value R of the entire power source wiring circuit and the value I of consumption current. Meanwhile, the value of the change in AC component voltage change corresponds to the product L×(dI/dt) of the inductance value L of the entire power source wiring circuit and the change ratio dI/dt of consumption current per unit time.

In the electromagnetic noise, there exists an allowable operation voltage margin, and the operation voltage margin is the voltage equivalent to approximately 5% of the power source voltage.

However, along with fine configuration, the power source voltage is saturated but low, and the operation voltage margin also becomes small. In general, it is necessary to make the electromagnetic noise limited in the range of the operation voltage margin.

If the power source noise exceeds the operation voltage margin, some phenomena occur like the power source voltage and the grounding potential those are normally constant fluctuate largely, and the Power Integrity is deteriorated.

And at the same time, the Signal Integrity among circuits becomes deteriorated, LSI sees malfunction, and in the worst case, by occurrence of unnecessary radiation, that is, unnecessary electromagnetic wave, EMI (Electromagnetic Interface) exceeds allowable values, leading to an environmental issue.

In the future, when microfabrication and integration are applied to digital LSI, the consumption current and the time change ratio of the consumption current will easily increase, and there is a fear that the electromagnetic noise may exceed the range of the operation voltage margin that will become smaller.

Accordingly, in order to manufacture digital LSI while maintaining its compact and thin and light-weight structure and multi functions by fine configuration and integration, it is necessary to provide some feature and design to digital LSI so as to make the chip temperature where consumption current is going to increase in future becomes the main factor within the range of the operation guarantee temperature, and make the power source noise which comes to the main factor limited in the range of the operation voltage margin, power budget value at which the power supply is available under the maximum power of the semiconductor integrated circuit device is preset, and application specifications can be satisfied within the range of the power budget value.

In general, as technologies to make the consumption current small, there are two technologies. One is power gating technology wherein power shutout to shut out power source voltage and action block shutout to shut out operation clock and the like are arranged to plural processors and ASIC loaded on digital LSI, and the other is power control technology wherein power source voltage or operation frequency is controlled for the processors and ASIC.

The present inventors had examinations on a power consumption control device according to the prior art disclosed in Japanese Patent Laid-Open No. H8-152945 (Patent Document 1, hereinafter), with the digital household electric appliances as objectives before the present application. The Patent Document 1 is a patent concerning a power consumption control device wherein the power control technology is employed and application specifications are satisfied within the power budget value. Further, in the Patent Document 1, the use of the power gating technology is included. Before extracting problems, the Patent Document 1 is explained.

FIG. 21 is a structural diagram of a power consumption control device described in FIG. 4 of the Patent Document 1, and FIG. 22 is a structural diagram of a power consumption control device described in FIG. 2 of the Patent Document 1.

Function blocks 111 request for necessary power according to the present load condition. An information collection unit 104 adds and collects required power from the respective function blocks. A supply power distribution determination unit 102, when the total of added and collected power is within supplyable power value, instructs a power distribution unit 105 and outputs power requirement to the respective function blocks, and when the total of power exceeds the supplyable power value, it determines a power distribution method according to a predetermined method, and instructs the power distribution unit 105 and distributes and outputs supplyable power to the respective function blocks according to the power distribution method.

In the power consumption control technology by a power consumption control device of such a structure, there are the following problems to be solved.

First, as the first problem, for example when the function block 111 is a processor that can flexibly change processing contents, different from ASIC where the power value can be fixed, the required power is different per processing content, that is, per task, therefore, the number of combinations of power distribution 203 is large and they become complicated, therefore it is difficult to package a power distribution candidate table unit 202, and it poses a problem.

Further, a power consumption control device 401 has the power distribution candidate table unit 202, selection unit 204 and distribution unit 206 thereon, even when desired plural function blocks 111 work it sets the power distribution unit 105 with appropriate power distribution 203, thereby it can perform the power supply control within the power budget value.

However, as the second problem, for example, when the function block to which the power distribution unit 105 supplies low power source voltage and low operation frequency, that is, supplies low power in the course of process and satisfies a specified process to complete it, since the priority and the contents of the power distribution method are not clear, there is a fear that it cannot supply high power to the power distribution unit 105 and high speed processing cannot ever be recovered.

Further, when the total required power exceeds the power budget value in the course of process, for example, in the case where the total required power is made low to a certain function block 111 according to a priority by use of the power gating technology, since the process of the function block 111 is stopped by the power consumption control unit 401, if the power consumption control unit 401 lets the function block 111 be uncontrolled, operation cannot be made later, and there occurs a fear that the dead line of application specifications cannot be satisfied.

Accordingly, it is necessary to set time for the function block 111 that is in stop state according to the priority and release the stop state to supply power and the like.

The third problem is that the power consumption of the power consumption control unit 401 is added to the total required power.

When the digital LSI is realized by one digital LSI, it is necessary to make the total required power including the power consumption control unit 401 within the power budget value.

Further, the fourth problem is to limit the maximum power value of the digital LSI within the allowable power of power source IC.

When the power consumption control unit fails rapid sampling of large total required power by simultaneous driving of many function blocks, that is, when timing of comparison with the power budget value is lost, the allowable power of power source IC is exceeded, and sufficient power cannot be supplied to the respective function blocks, and the process is broken and nonconformity occurs.

Accordingly, it is necessary to estimate power margin within allowable power precisely and limit the maximum power.

The fifth problem is to judge whether the set of function blocks is in idle state or not.

In the case where the digital LSI is realized by one semiconductor integrated circuit device, it is ideal to arrange a power source voltage distribution unit per function block, however, in order to prevent the chip area of digital LSI from becoming large, the power source voltage distribution unit is often allotted and packaged to a set of relative function blocks.

Therefore, if it is known that all the function blocks belonging to the set are in idle state, shutdown of power source voltage can be made collectively for the function blocks belonging to the set, and low power consumption can be realized.

The sixth problem is that even when plural function blocks 111 are loaded, it is necessary to set power in other function blocks than the power consumption control unit.

When the function block 111 is regarded as a processor or a controller, normally, it is possible to change the power source voltage value and settings of operation frequency of the power distribution unit 105 from software that operates the function block, for example, before the function block completes a specified process and gets in idle state, by setting of the software, the function block itself can get in stop state, and therefore low power consumption can be realized.

However, in the power consumption control unit 401 in Patent Document 1, power setting can be made only by the power consumption control unit, therefore, it is necessary to arrange a mechanism to set power from the function block.

SUMMARY OF THE INVENTION

The object of the present invention is to provide a technology for performing execution scheduling of function blocks so as to control the total required power of a single or plural function blocks within a supplyable power budget value, and thereby realizing stable operations with low power consumption.

Main points of the invention disclosed in the present application are described below.

A semiconductor integrated circuit device comprises a single or plural function blocks, a power consumption control unit that controls total required power of function blocks and determines the supply power of the respective function blocks, an operation clock distribution unit that supplies operation clock per function block and the power consumption control unit, a power source voltage distribution unit that supplies power source voltage per function block and the power consumption control unit, a power conversion unit that collects power consumption component signals in function blocks and the power consumption control unit and converts them into total required power, a volatile semiconductor memory such as RAM that the function blocks and the power consumption control unit can read and write, a nonvolatile semiconductor memory such as ROM that the function blocks and the power consumption control unit can read, and a timer, and these are connected by buses, and data are sent and received among them.

Identifiers are provided to all the function blocks, and on local memory area corresponding to RAM area that the function blocks and the power consumption control unit can read and write, a list is arranged to store the identifiers and the priority of task allotted to task operating on the function blocks, power mode value to show either high power mode at which the function blocks operate with high power source voltage and high speed operation clock or low power mode at which the function blocks operate with low power source voltage and low speed operation clock or stop mode at which the function blocks get in stop state, and a single or plural function block corresponding link lists (function block control link list) for controlling schedule of the task provided with a list which stores a power mode time indicating a duration of the low power mode or the stop mode as a parameter, and linkable to the list, power control link list for controlling function blocks in action currently at high power mode, suspending link list for controlling function blocks in stop currently at stop mode, and low power control link list for controlling function blocks in action currently at low power mode, that are linkable with the list, are prepared.

When a function block is used, into the function block corresponding link list corresponding to the identifier of the function block, the list to which the priority of task operating on the function block and the identifier and the power mode value showing high power mode and power mode time is inserted and linked in the order of the high priority, and at the same time, to the power control link list, head lists of all the function block corresponding link lists are linked in the order of low priority.

If the total required power does not exceed the power budget value equivalent to the value obtained by subtracting the margin voltage from the allowable voltage of power source IC, the setting of the power distribution unit is fixed.

On the contrary, when there is no adverse effect on application specifications even if the total required power exceeds the power budget value and the power supply is stopped, to the time control unit that controls the timer, the power mode value showing stop mode and the power mode time are set, to the head list of the power control link list, the power mode value and the power mode time are stored, from the power control link list the head list is excluded, the operation clock and the power source voltage supplied to the function block corresponding to the identifier stored in the excluded head list are shut down by the power distribution unit and the function block is made into stop mode, and the head list excluded is linked to the suspending link list in the order of high priority.

In the same manner, when there is any adverse effect on application specifications even when it exceeds that and the power supply is stopped, to the time control unit the power mode value showing low power mode and the power mode time are set, to the head list of the power control link list the power mode value and the power mode time are stored, from the power control link list the head list is excluded, the operation clock and the power source voltage supplied to the function block corresponding to the identifier stored in the excluded head list are lowered by the power distribution unit and the function block is made into low power mode, and the head list excluded is connected to the low power link list in the order of high priority.

Further, when the use of a function block is completed, the operation clock and the power source voltage supplied to the function block corresponding to the identifier stored in the head list of the suspending link list are raised by the power distribution unit, and the head list is excluded and they are inserted again into the power control link list in the order of low priority, and at the same time, the operation clock and the power source voltage supplied to the function block corresponding to the identifier stored in the head list of the low power link list are raised by the power distribution unit, and the head list is excluded and they are inserted again into the power control link list in the order of low priority, and then the head list of the completed function block corresponding link list is deleted.

When the power mode value output from the time control unit after the power mode time set in the time control unit shows the stop mode, the shutout of the operation clock and the power source voltage of the power distribution unit corresponding to the identifier stored in the head list of the suspending link list are released, and the head list is excluded from the suspending link list and is inserted again into the power control link list.

When the power mode value shows the low power mode, the operation clock and the power source voltage of the power distribution unit corresponding to the identifier stored in the head list of the low power link list are raised, and the head list is excluded from the low power link list and is inserted again into the power control link list.

As described above, among the proposed means, by arranging linear link lists including the function block corresponding link list, the power control link list, the suspending link list and the low power link list and the like on local memory, even for addition and deletion of scalable function block those were impossible in the table where the number of function blocks and power distribution are fixed such as power distribution candidate table, and even when a task is added and deleted scalably by an operating system (hereinafter OS) by processor in the function block, it is possible to perform packaging and operation flexibly and easily, thereby the first problem can be solved.

Further, among the proposed means, by controlling the list storing the priority of the task allotted to the identifier and the information processing device, mode values showing high power mode at which the function blocks operate with high power source voltage and high speed operation clock or low power mode at which the function blocks operate with low power source voltage, low speed operation clock or stop mode at which the function blocks get in stop state, and mode time indicating the duration of the low power mode of stop mode as parameters, by the function block corresponding link list, the power control link list, the suspending link list and the low power link list, even when the function block gets in the stop state or the low power state, high power can be supplied to the power distribution unit after the mode time, and accordingly, the second problem can be solved.

Furthermore, among the proposed means, by structuring a semiconductor integrated circuit device comprising a single or plural function blocks, the power consumption control unit, the operation clock distribution unit, the power source voltage distribution unit, the power conversion unit, the volatile semiconductor memory, and the nonvolatile semiconductor memory, and connecting them by buses, and making data receiving and sending available, it is possible to arrange a structure for setting its own power from the function block and the power consumption control unit, and a structure for adding the power consumption of the power consumption control unit to the total required power, and accordingly, the third problem and the sixth problem can be solved.

Moreover, the power consumption control unit compares the total required power with the power budget value as the value obtained by subtracting the power margin value from the allowable power of power source of the power source IC, for example, thereby controls the total required power at the allowable power or below. By making it the power budget value, it is possible to make the total required power within the allowable power precisely, and accordingly, the fourth problem can be solved.

Finally, in the case where the power source voltage distribution unit is allotted to a set of relative function blocks, it is judged whether the list is linked to the function block corresponding link list corresponding to the identifier of all the function blocks of the set or not, thereby it is possible to shut down the power source voltage by the power source voltage distribution unit corresponding to all the identifiers, and accordingly, the fifth problem can be solved.

The above and other objects and novel characteristics of the present invention will be apparent from the description of this specification and the accompanying drawings.

The typical ones of the inventions disclosed in this application will be briefly described as follows.

It is possible to perform packaging and operation flexibly and easily for scalable addition and deletion of function blocks loaded on a semiconductor integrated circuit device, thereby achieving low power consumption effects and stable operations.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
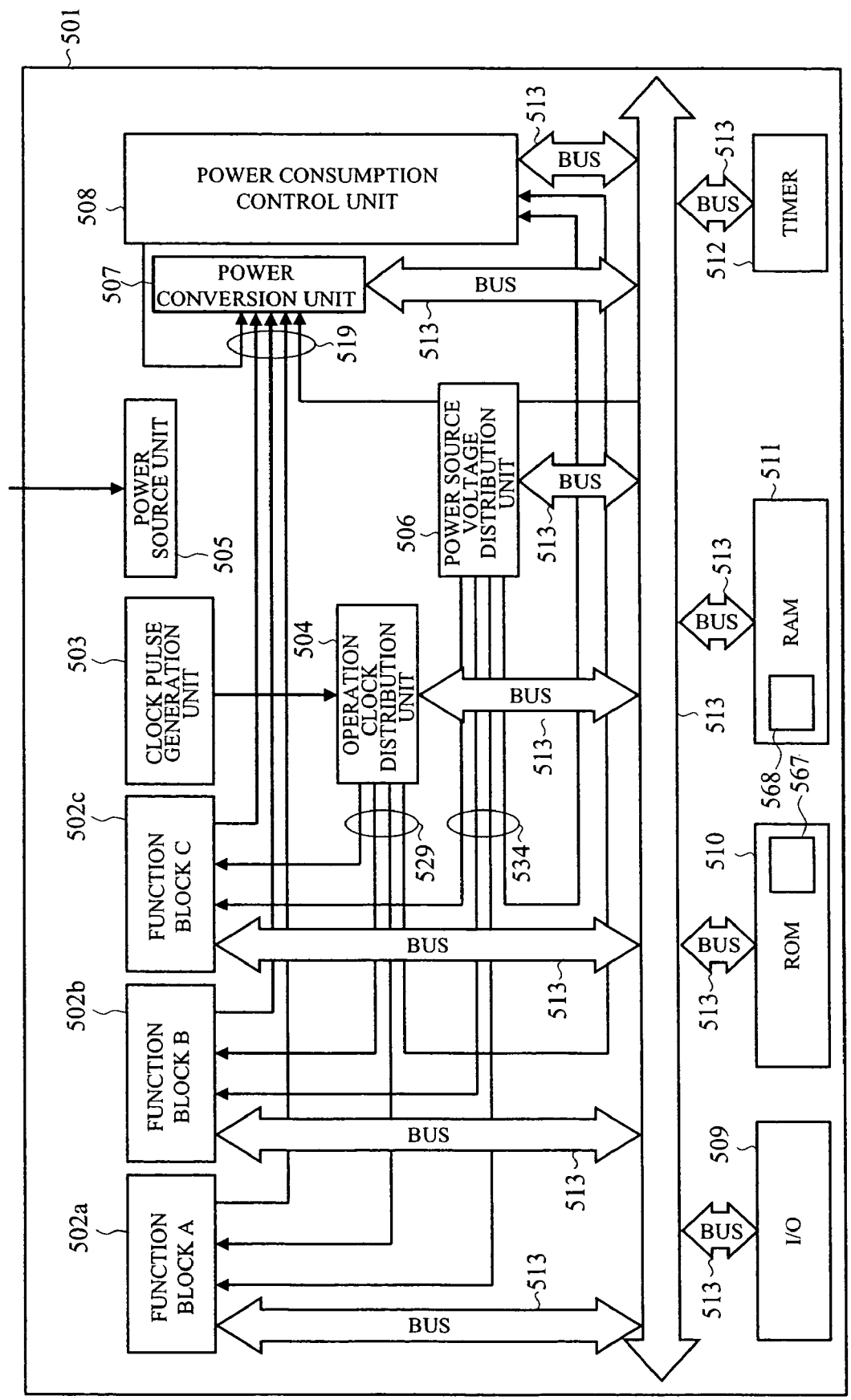
FIG. 1 is a figure for explaining a preferred embodiment of a hardware configuration of a representative example according to the present invention.

FIG. 1 is a figure for explaining a preferred embodiment of a hardware configuration of a representative example according to the present invention.

A semiconductor integrated circuit device 501 includes a single or plural function blocks 502, a clock pulse generation unit 503, an operation clock distribution unit 504, a power source unit 505, a power source voltage distribution unit 506, a power conversion unit 507, a power consumption control unit 508, an I/O unit 509, a ROM (nonvolatile semiconductor memory) 510, a RAM (volatile semiconductor memory) 511, a timer 512, and buses 513.

The function blocks 502, the operation clock distribution unit 504, the power source voltage distribution unit 506, the power conversion unit 507, the power consumption control unit 508, the I/O unit 509, the ROM 510, the RAM 511, and the timer 512 are connected via the buses 513.

Figure 2:
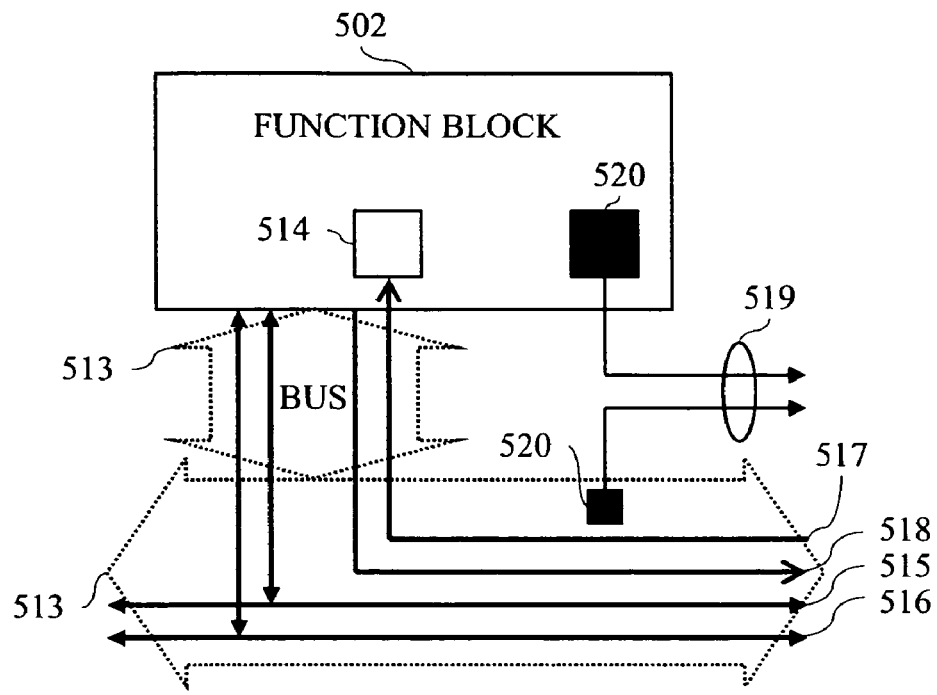
FIG. 2 is a figure for explaining the relation between the function blocks and the buses.

FIG. 2 is a figure for explaining the relation between the function blocks and the buses.

The function block 502 is equivalent to an exclusive circuit of ASIC, accelerator and the like, and a general purpose circuit performing command control, data processing and the like programmably according to software stored in processor, DSP, FPU, and ROM 510, RAM 511 such as FPGA and the like. The respective function block has an interrupt receiving unit 514.

The bus 513 is structured of a command control line 515 for executing a command issued by the function block 502 and a data transmission line 516 via which the function block 502 performs reading and writing by the ROM 510, the RAM 511, meanwhile, for easy explanation in the present specification, further a single or plural interrupt receiving lines 517 and interrupt sending lines 518 are added to the structure.

Further, the function block 502 has a power sensor 520 that measures a power consumption structural element signal 519. The power sensor 520 sequentially transfers the power consumption structural element signal 519 to the power conversion unit 507. The power sensor 520 is equivalent to for example a performance counter that measures the number of switching times of CMOS circuit, a temperature sensor that measures heat amount, a power monitor that measures consumption current and voltage.

Figure 3:
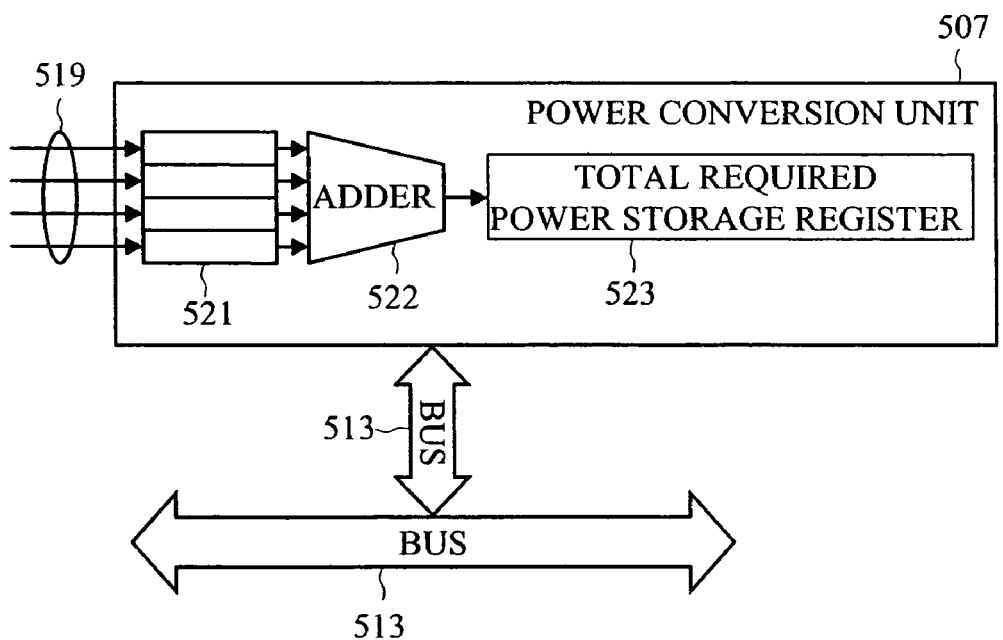
FIG. 3 is a figure for explaining a power conversion unit.

FIG. 3 is a figure for explaining the power conversion unit.

The power conversion unit 507 is structured of a power conversion unit 521 and an adder 522 and a total required power storage register 523.

The power conversion unit 521 converts the power consumption structural element signal 519 into a function required power value. The adder 522 sequentially stores the total required power obtained by totaling all the function required power value into the total required power storage register 523.

Figure 4:
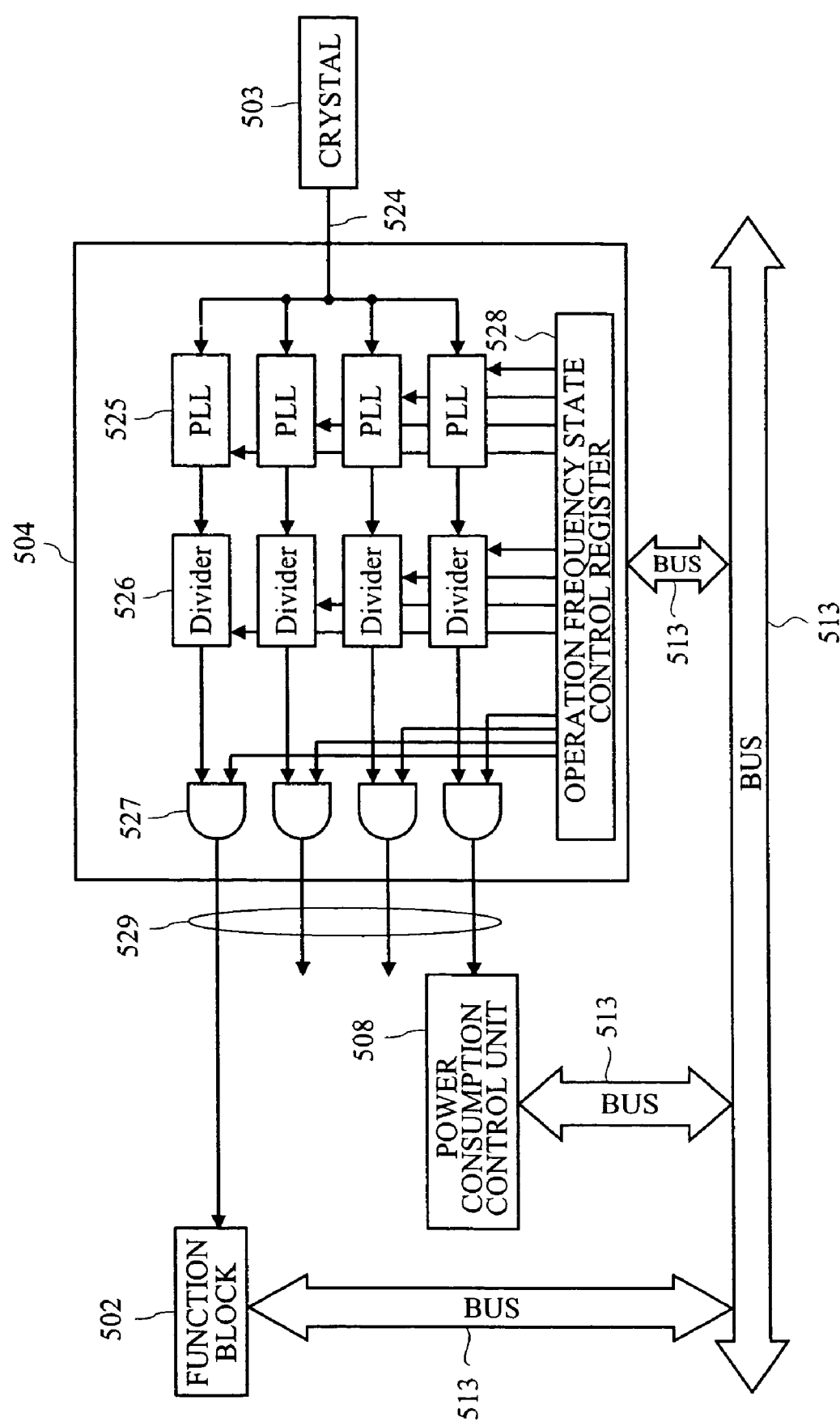
FIG. 4 is a figure for explaining a clock pulse generator and an operation clock distribution unit.

FIG. 4 is a figure for explaining a clock pulse generator and an operation clock distribution unit.

The clock pulse generator 503 is provided as for example a crystal piece, and generates a pulse 524.

The operation clock distribution unit 504 is structured of a PLL (Phase Locked Loop) circuit 525 to respond to all the function blocks 502 and the power consumption control unit 508, a divider 526, an operation clock shutdown unit 527, and an operation frequency state control register 528.

The operation clock distribution unit 504 gradually multiplies the pulse 524 generated by the clock pulse generator 503 by a PLL 525, and converts the result into the operation clock 529 by the divider 526 to output it to the respective function blocks 502.

The operation frequency state control register 528 shuts down the operation clock 529 to a specified function block 502 according to setting. Further the register 528 changes the PLL 525 and the divider 526 according to the bit pattern of the operation frequency state control register 528 and supplies a desired operation frequency to the function block 502.

Figure 5:
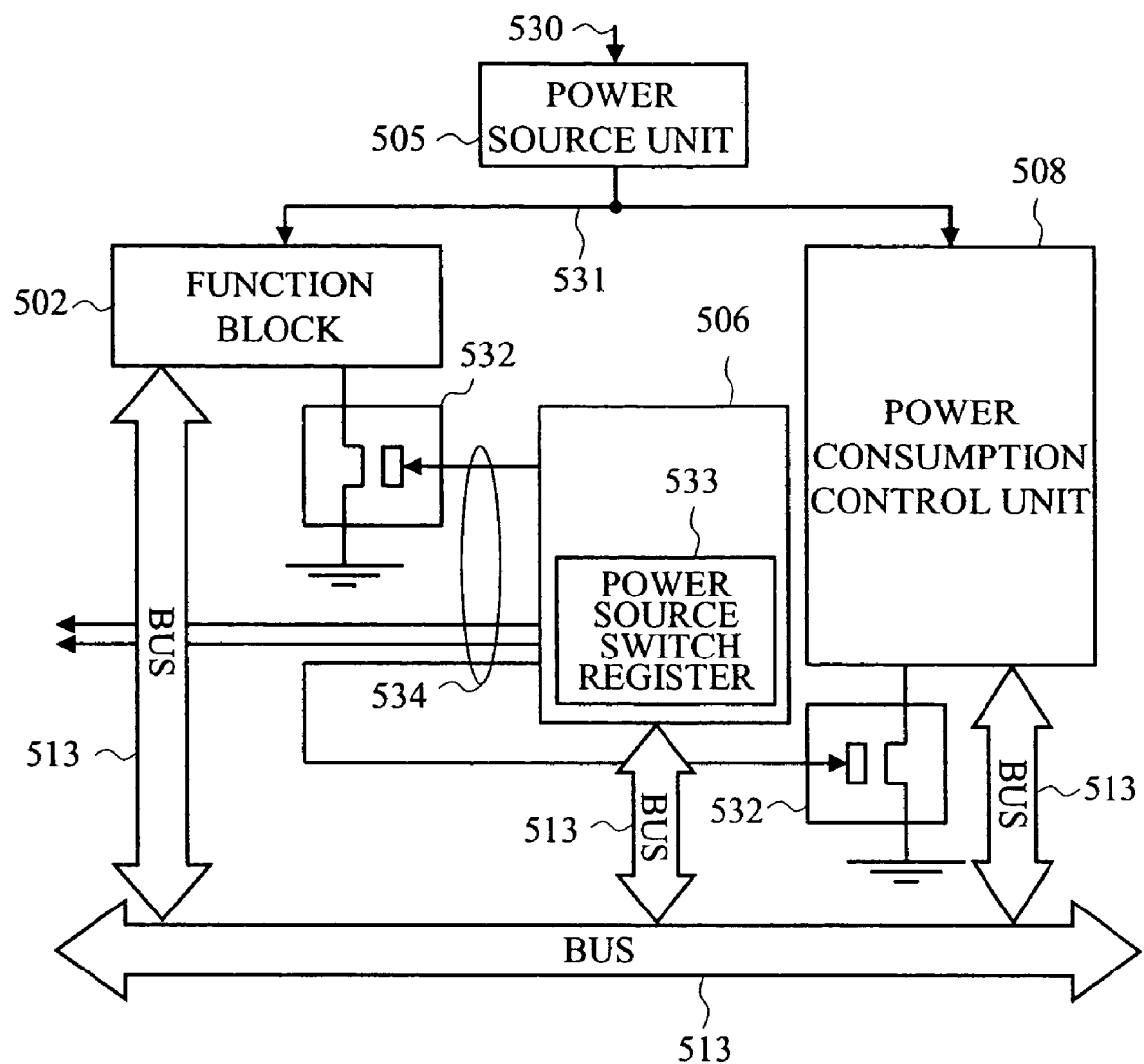
FIG. 5 is a figure for explaining a power source unit and a power source voltage distribution unit.

FIG. 5 is a figure for explaining a power source unit and a power source voltage distribution unit.

The power source unit 505 is provided as a power source IC that converts for example battery voltage 530 into power source voltage 531, and supplies the power source voltage 531 to the function block 502 and the power consumption control unit 508. Further, as a power source circuit system, in addition to the power source unit 505, a power source switch 532 is packaged to the function block 502.

The power source voltage distribution unit 506 has a power source switch register 533 that sets the power source switch 532, and by setting the bit pattern of the power source switch register 533, sends a power source switch control signal 534 that turns ON or OFF the power source switch 532 of a specified function block 502, and supplies or shuts down the power source voltage 531.

Figure 6:
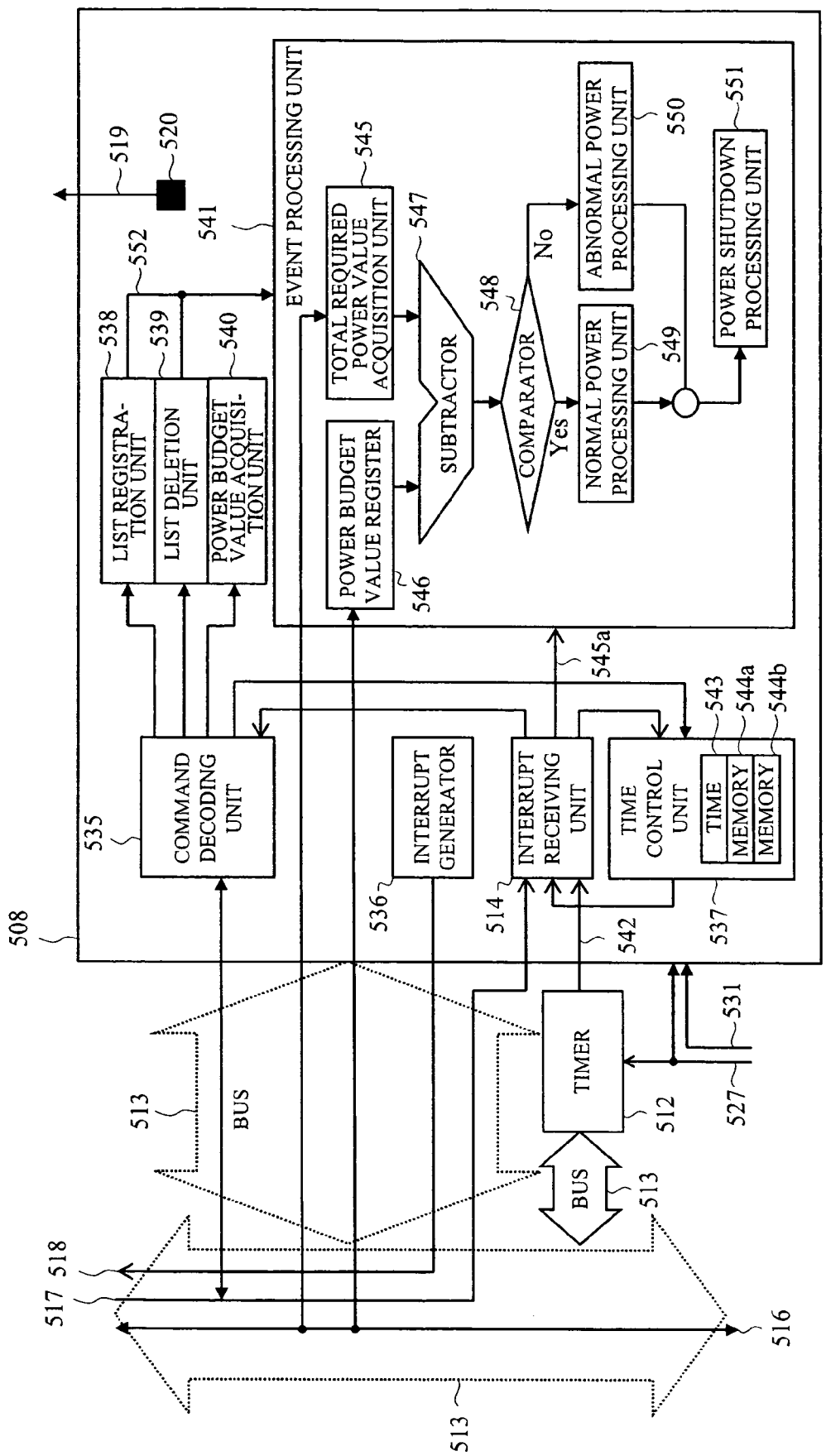
FIG. 6 is a figure for explaining a preferred embodiment of a representative power consumption control unit according to the present invention.

FIG. 6 is a figure for explaining a preferred embodiment of a representative power consumption control unit according to the present invention.

The power consumption control unit 508 is structured of a command decoding unit 535, an interrupt receiving unit 514, an interrupt generator 536, a time control unit 537, a list registration unit 538, a list release unit 539, a power budget value acquisition unit 540, an event processing unit 541, and a power sensor 520. Further, to the power consumption control unit 508, a bus 513 and a timer 512 are connected.

Although it is not described because of simplified figure, the timer 512 is of the same kind as the function block 502. The timer 512 converts the operation clock 529 input from the operation clock distribution unit 504 into a timer event 542.

The interrupt receiving unit 514 notifies that there has been a timer interrupt in the timer event 542 to the time control unit 537.

The time control unit 537 adds 1 to a system clock memory 543 at every input of the timer event 542, and counts the number of timer interrupt times.

Further, the time control unit 537 sets a specified cycle time from the function block 502 to a countdown memory A544a, and subtracts one from the countdown memory A544a at every timer event 542. When the countdown memory becomes zero, the unit 537 generates a cycle event 545a, and starts the event processing unit 541, and resets the cycle time automatically to the countdown memory A544a, and repeats the cycle event 545a.

Furthermore, the time control unit 537 sets a specified alarm time from the function block 502 to the countdown memory B544b, and subtracts one from the countdown memory B544b at every timer event 542. When the countdown memory becomes zero, the unit 537 generates an alarm event, and starts the event processing unit 541.

The event processing unit 541 is structured of a total required power value acquisition unit 545, a power budget value register 546, a subtractor 547, a comparator 548, a power normal processing unit 549, a power abnormal processing unit 550, and a power shutdown processing unit 551.

When the event processing unit 541 starts, the command decoding unit 535 acquires the total required power via the bus 513 from the total required power storage register 523 of the power conversion unit 507, to the total required power value acquisition unit 545, and stores it to the total required power value acquisition unit 545.

Next, the event processing unit 541 inputs the subtraction result obtained by subtracting the total required power stored in the total required power value acquisition unit 545 from the power budget value stored in the power budget value register 546 by the subtractor 547 into the comparator 548.

The comparator 548 judges whether the subtraction result is zero or more. If the subtraction result is zero or more, execution is shifted to the power normal processing unit 549, and if it is minus, execution is shifted to the power abnormal processing unit 550.

Finally, after execution of the power normal processing unit 549 and the power abnormal processing unit 550, execution is shifted to the power shutdown processing unit 551.

The power consumption control unit 508 shifts execution to the command decoding unit 535 when the interrupt receiving unit 514 receives interrupt from the function block 502.

The command decoding unit 535 shift execution to one of the list registration unit 538, the list release unit 539, the power budget value acquisition unit 540, and the time control unit 537, according to kinds of interrupt elements.

The list registration unit 538 and the list release unit 539, just after process, give a start event 552 to the event processing unit 541.

The interrupt generation unit 536 is used in the power normal processing unit 549.

Figure 7:
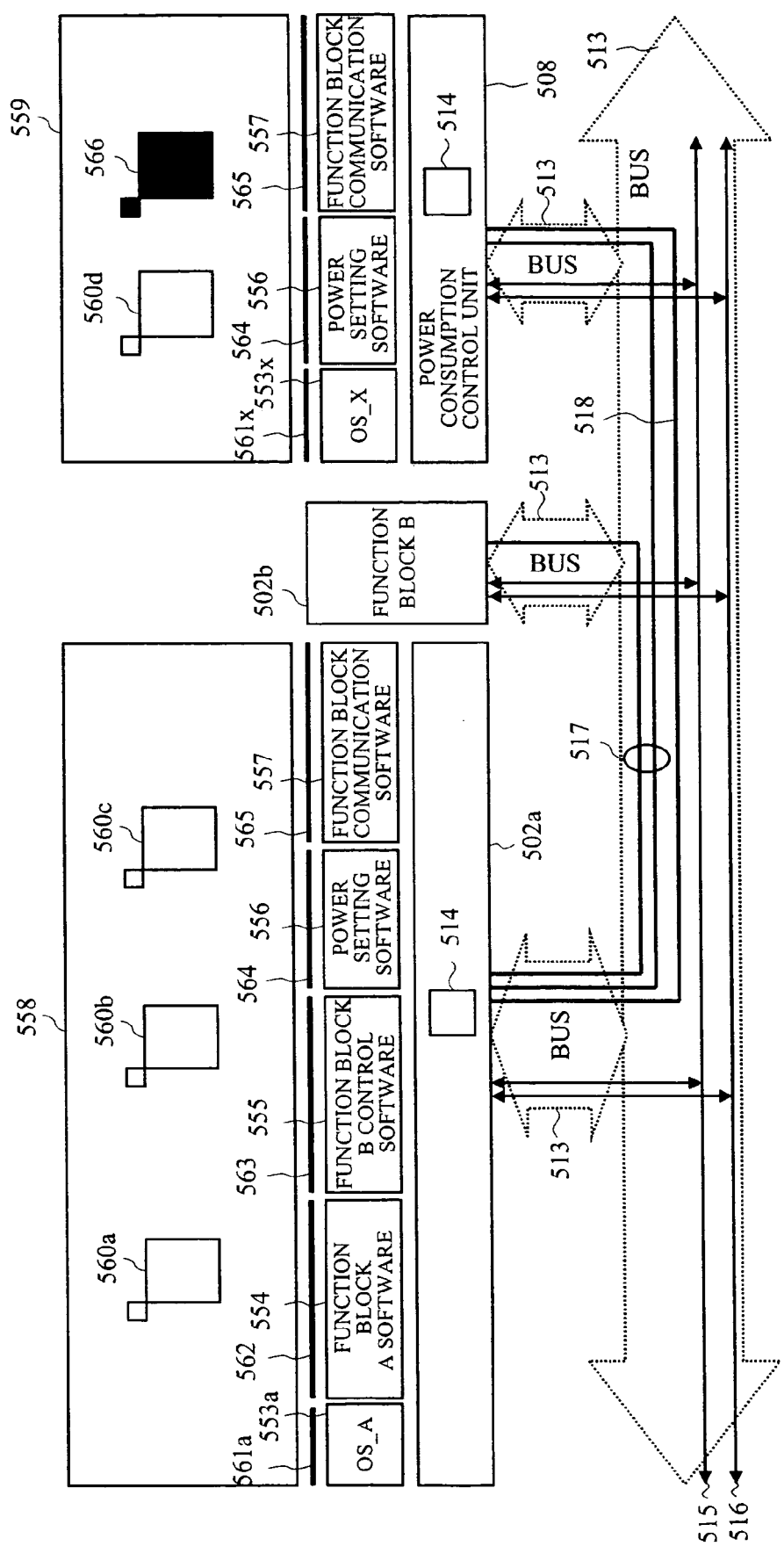
FIG. 7 is a figure for explaining software for operating the function block and the power consumption control unit.

FIG. 7 is a figure for explaining software for operating the function block and the power consumption control unit.

Further, in the present specification, the relation between master and slave among the function blocks 502 is defined as that the master function block gives a command to the slave function block, and the slave function block generates an interrupt to the master function block after completion of the specified process of the slave function block, and the master function block receives the interrupt.

And the definition of a task is a thread or process controlled by an OS operating on the master function block, and the slave function block. That is, thread, process and slave function block unit becomes a task unit. However, when the OS is loaded on the slave function block, the slave function block is not the unit, but the thread or process operating on the slave function block becomes the task unit.

Accordingly, the function block A 502a in FIG. 7 is the master, and the function block B502b is the slave. Further, the relation between the function block A 502a and the power consumption control unit 508 becomes a master, or a slave to each other.

The power consumption control unit 508 may be packaged in the exclusive circuit or the general purpose circuit, but hereinafter, explanation is made on assumption of the use of the general purpose circuit, that is, processor.

The software to operate on the function block A 502a is structured of OS_A 553a, function block A software 554, function block B control software 555, power setting software 556, function block communication software 557, and application software 558, and the software to operate on the power consumption control unit 508 is structured of OS_X 553x, power setting software 556, function block communication software 557, and power control application software 559.

The application software 558 is structured of a thread 560 controlled by the OS_A 553a, and calls out the system call A 561a of the OS_A 553a, the function block A application programming interface (hereinafter, referred to as API) 562 of the function block A software 554, the function block B control API 563 of the function block B control software 555, the power setting API 564 of the power setting software 556, and the function block communication API 565 of the function block communication software 557, and realizes application specifications.

The power control application software 559 is structured of a thread 560 controlled by the OS_X 553x, and calls out from the power control thread 566 system call X 561x of the OS_X 553x, power setting API 564, and function block communication API 565, and thereby realizes power control application specifications.

The thread 560 and the power control thread 566 call out system call A 561a, system call X 561x supplied by the OS_A 553a and OS_X 553x, and thereby realize thread control, time control, sync/async communications, and other functions.

They also call out the function block A API 562 supplied by the function block A software 554, and thereby perform specified processes by the function block A 502a.

Further, they also call out the function block B API 563 supplied by the function block B software 555, and thereby perform specified processes by the function block B 502b.

In the same manner, they call out the power setting API 564 supplied by the power setting software 556, and thereby set the power to the function block 502, that is, set the operation clock, shutdown, supply of power source voltage, and operation frequency.

In the same manner, they call out the function block communication API 565 supplied by the function block communication software 557, and thereby realize the function to transfer data with the function block 502.

Meanwhile, the power setting software 556, the function block communication software 557, and the power control thread 566 are stored in a specified program memory 567 as a part of the ROM 510.

Further, the power setting software 556, the function block communication software 557, and the power control thread 566 perform specified processes by use of the specified working memory 568 as one area of the RAM 511 that can be read and written by the power consumption control unit 508.

The specified working memory 568 is used for data processing. Other software is mapped to the ROM 510 other than the specified program memory 567, and for data processing, the RAM 511 areas other than the specified working memory 568 is used.

Figure 8:
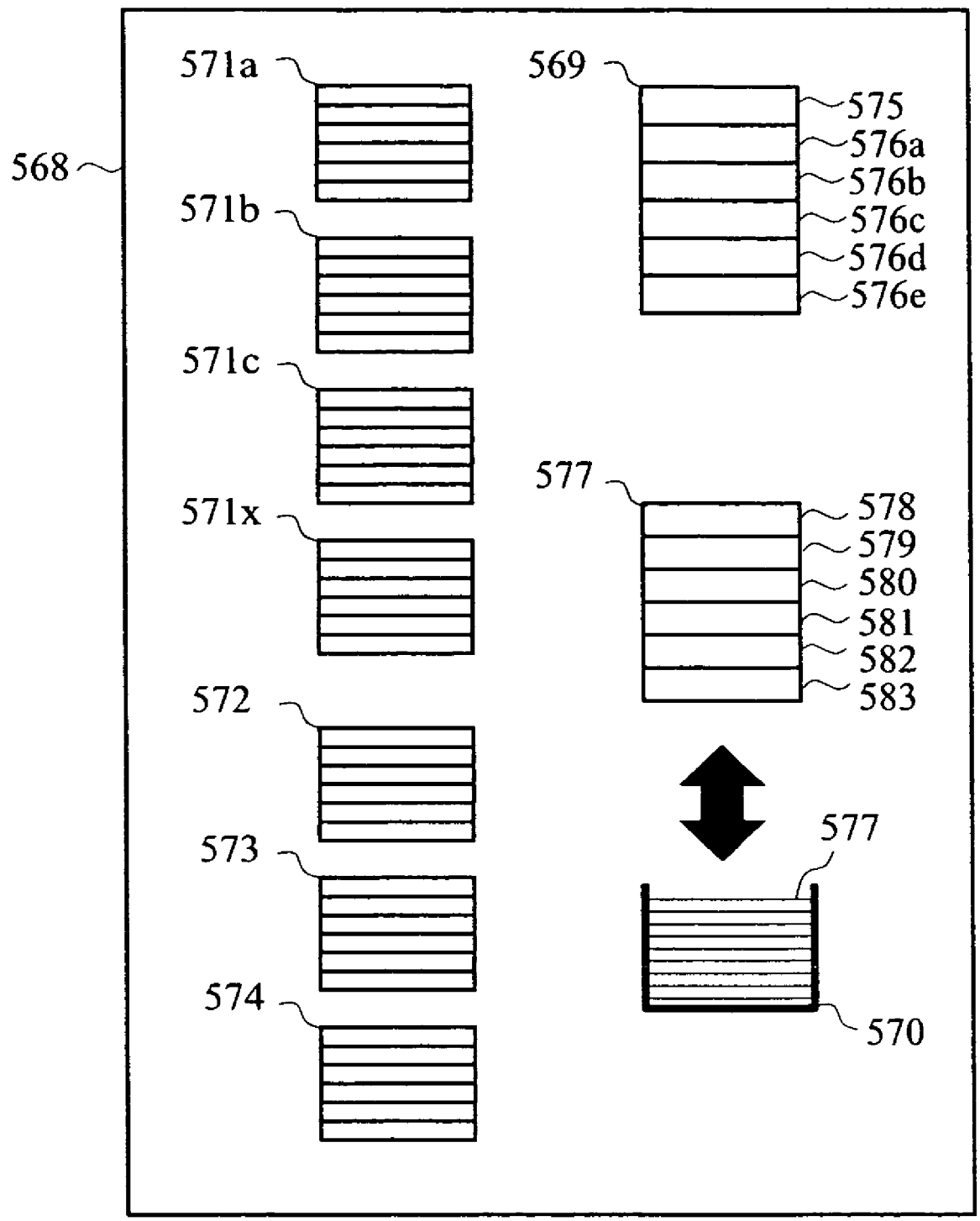
FIG. 8 is a figure for explaining a preferred embodiment of the structure of the specified working memory.

FIG. 8 is a figure for explaining a preferred embodiment of the structure of the specified working memory.

The specified working memory 568 is structured of a function block communication structural body 569, a list pool 570, a single or plural function block guard 571 for the number of function blocks, a power control guard 572, a suspending guard 573, and a low power guard 574.

The function block communication structural body 569 is a memory block to store a command identifier memory 575 and a single or plural communication parameter memory 576.

The list pool 570 is a set of lists 577 to be supplied to the link list. And the list 577 is a dynamic memory block to store parameters including a task control pointer memory 578, a power control pointer memory 579, a task priority memory 580, a function block identifier memory 581, a power mode value memory 582 and a power mode time memory 583 and the like.

The function block guard 571, the power control guard 572, the suspending guard 573, and the low power guard 574 are of the same memory format as that of the list 577, but are static memory blocks not supplied from the list pool 570.

Further, the function block guard 571, the power control guard 572, the suspending guard 573, and the low power guard 574, using the list 577 respectively, control the function block link list, the power control link list, the suspending link list, and the low power link list.

The function block link list performs the task control of the function block 502. To the task control pointer memory 578 of the function block guard 571, the address of the head list is stored, and at the same time, the address of the function block guard 571 is stored into the task control pointer memory 578 of the tail list.

Between the head list and the tail list, the list 577 is connected to the task control pointer memory 578 in the order of high priority so that the task priority of the head list should be at the highest priority, and the task priority of the tail list should be at the lowest priority. Further, when the lists 577 of the same task priority are connected, they are connected in the order of FIFO (First In First Out).

The power control link list controls the total required power. To the power control pointer memory 579 of the power control guard 572, the address of the head list is stored, and at the same time, the address of the power control guard 572 is stored into the power control pointer memory 579 of the tail list.

Between the head list and the tail list, the list 577 is connected by use of the power control pointer memory 579 in the order of low priority so that the task priority of the head list should be at the lowest priority, and the task priority of the tail list should be at the highest priority. Further, when the lists 577 of the same task priority are connected, they are connected in the order of FIFO.

The suspending link list controls of shutdown and supply of operation clock in the power clock distribution unit 504. To the power control pointer memory 579 of the suspending guard 573, the address of the head list is stored, and at the same time, the address of the power control guard 572 is stored into the power control pointer memory 579 of the tail list.

Between the head list and the tail list, the list 577 is connected by use of the power control pointer memory 579 in the order of high priority so that the task priority of the head list should be at the highest priority, and the task priority of the tail list should be at the lowest priority. Further, when the lists 577 of the same task priority are connected, they are connected in the order of FIFO.

The low power processing link list controls the operation frequency in the operation clock distribution unit 504. To the power control pointer memory 579 of the low power guard 574, the address of the head list is stored, and at the same time, the address of the power control guard 572 is stored into the power control pointer memory 579 of the tail list.

Between the head list and the tail list, the list 577 is connected by use of the power control pointer memory 579 in the order of high priority so that the task priority memory 580 of the head list should be at the highest priority, and the task priority of the tail list should be at the lowest priority. Further, when the lists 577 of the same task priority are connected, they are connected in the order of FIFO.

Details of the power setting API 564 and the function block communication API 565 are explained hereinafter.

Meanwhile, the programming language specification to be used is supposed to be ANSI C, however, other programming language may be employed. The type of API is function type.

Before explanations, it is supposed that the power consumption control unit 508 is realized by a processor, and is structured of the power control thread 566, the OS_X 553$x$, the power setting software 556, and the function block communication software 557. That is, the command decoding unit 535, the interrupt receiving unit 514, and the interrupt generator 536 of the power consumption control unit 508 use processor, and the time control unit 537 uses the time control unit of the OS_X 553$x$.

As the power setting API 564, a power setting API 1 that accesses the operation frequency state control register 528 of the operation clock distribution unit 504 and sets the operation frequency, a power setting API 2 that accesses to the same and sets the shutdown and supply of the operation clock, a power setting API 3 that accesses the power source switch register 533 of the power source distribution unit 506 and sets the shutdown and supply of the power source voltage, a power setting API 4 that accesses the total required power storage register 523 of the power conversion unit 507 and loads the total required power value to the power consumption control unit 508 and the like are arranged.

Further, as the function block communication API 565, a function block communication API 1 that transmits to the power consumption control unit 508 that the thread 560 has been generated, a function block communication API 2 that transmits to the power consumption control unit 508 that the slave function block has been operated, a function block communication API 3 that transmits to the power consumption control unit 508 that the thread 560 is deleted from now, a function block communication API 4 that transmits to the power consumption control unit 508 that the action of the slave function block has completed, a function block communication API 5 that sets the power budget value from the master function block, a function block communication API 6 that sets the cycle time of the cycle event to the event processing unit 541 from the master function block, and the like are arranged.

Figure 9:
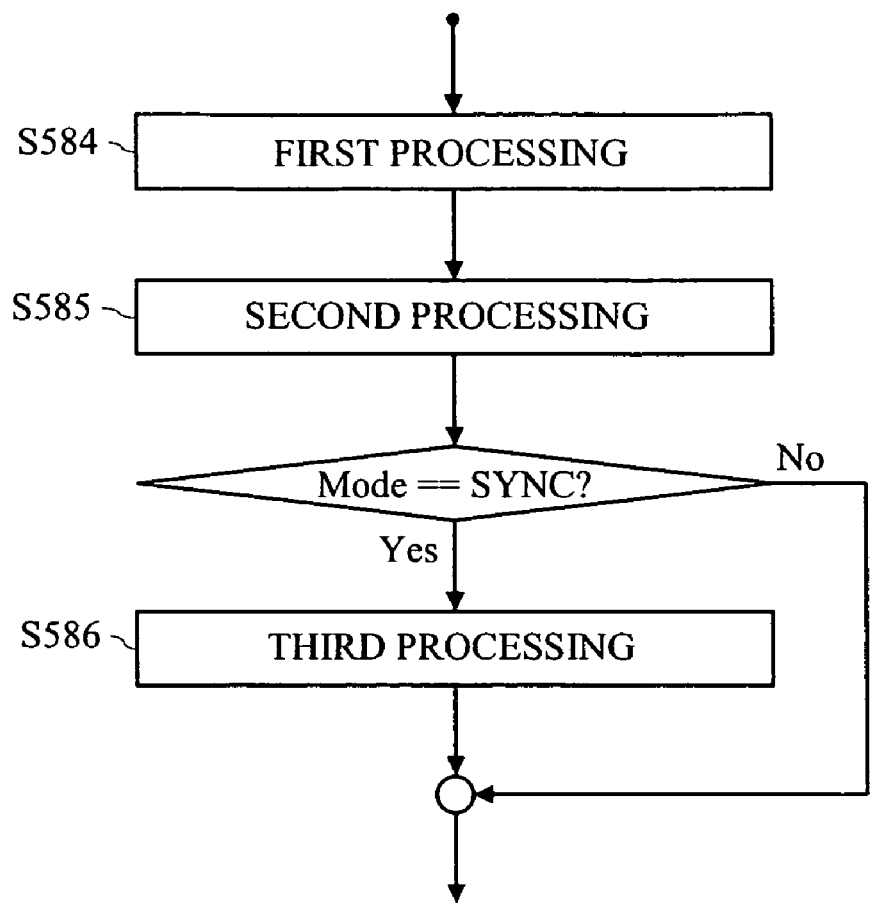
FIG. 9 is a flowchart of the function block communication API 1 and the function block communication API 2.

FIG. 9 is a flowchart of the function block communication API 1 and the function block communication API 2.

The function block communication API 1 sets as arguments the task priority of the thread 560 that a programmer or the OS_A 553$a$ sets, the function block identifier of the function block A 502$a$, the communication mode value for setting whether the communication between function blocks is sync or async, the power mode value for setting the high power mode, the middle power mode, or the low power mode of the function block, and the power mode time showing the holding time of the power mode value.

In the first process (step S584), to the command identifier memory 575 of the function block communication structural body 569, a command identifier corresponding to own command is stored, to the communication parameter memory A 576$a$, the task priority is stored, and to the communication parameter memory B 576$b$, a function block identifier is stored, to the communication parameter memory C 576$c$, the communication mode value is stored, to the communication parameter memory D 576*d*, the power mode value is stored, and to the communication parameter memory E 576*e*, the power mode time is stored respectively.

In the second process (step S585), an interrupt is made from the function block A 502*a* to the power consumption control unit 508.

Next, it is judged whether the communication mode is sync or async, and if it is sync, the procedure goes to the third process (step S586).

In the third process (step S586), by use of the power setting API 2, the action of the function block A 502*a* as the master function block is stopped.

The function block communication API 2 also sets as arguments in the same manner the task priority of the thread 560 that a programmer sets, the function block identifier of the function block B 502*b*, the communication mode value for setting whether the communication between function blocks is sync or async, the power mode value for setting the high power mode, the middle power mode, or the low power mode of the function block, and the power mode time showing the holding time of the power mode value, and the first process (S584), the second process (S585), and the third process (S586) are performed in the same manner.

However, in the third process (step S586), it is the function block B as the slave function block that stops the action by use of the power setting API 2.

Figure 10:
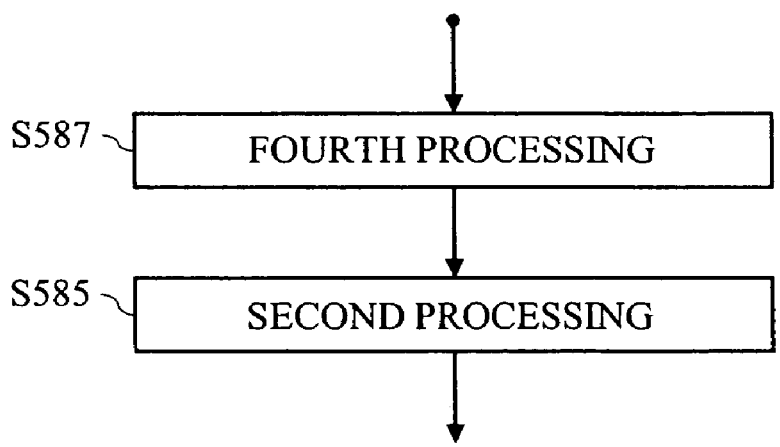
FIG. 10 is a flowchart of the function block communication API 3 and the function block communication API 4.

FIG. 10 is a flowchart of the function block communication API 3 and the function block communication API 4.

The function block communication API 3 sets the function block identifier of the function block A 502*a* as an argument.

In the fourth process (step S587), to the command identifier memory 575 of the function block communication structural body 569, a command identifier corresponding to own command is stored, and to the communication parameter memory A 576*a*, the function block identifier is stored respectively, and the second process (step S585) is performed.

In the same manner, in the function block communication API 4 too, the function block identifier of the function block B is set as an argument, and after the fourth process (step S587), the second process (step S585) is performed.

Figure 11:
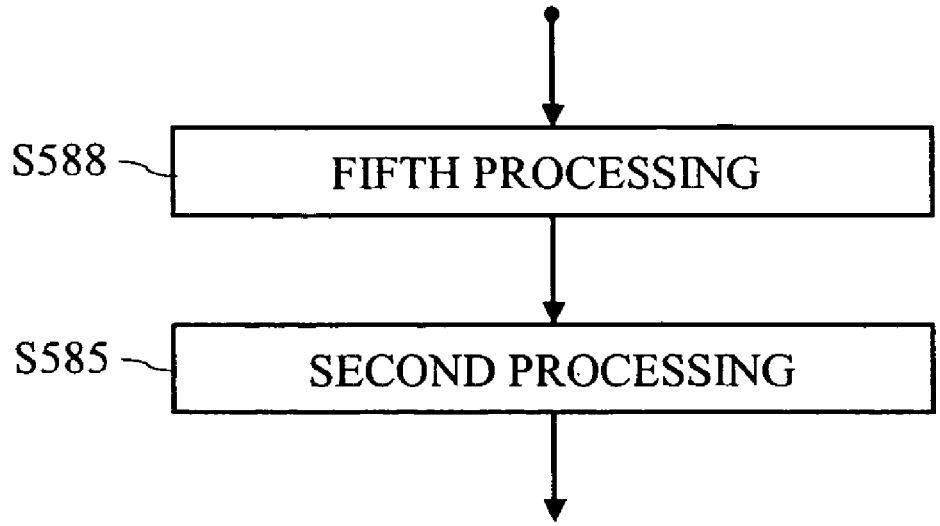
FIG. 11 is a flowchart of the function block communication API 5.

FIG. 11 is a flowchart of the function block communication API 5.

The function block communication API 5 sets the power budget value as an argument.

In the fifth process (step S588), to the command identifier memory 575 of the function block communication structural body 569, a command identifier corresponding to own command is stored, and to the communication parameter memory A 576*a*, the power budget value is stored respectively, and the second process (step S585) is performed.

Figure 12:
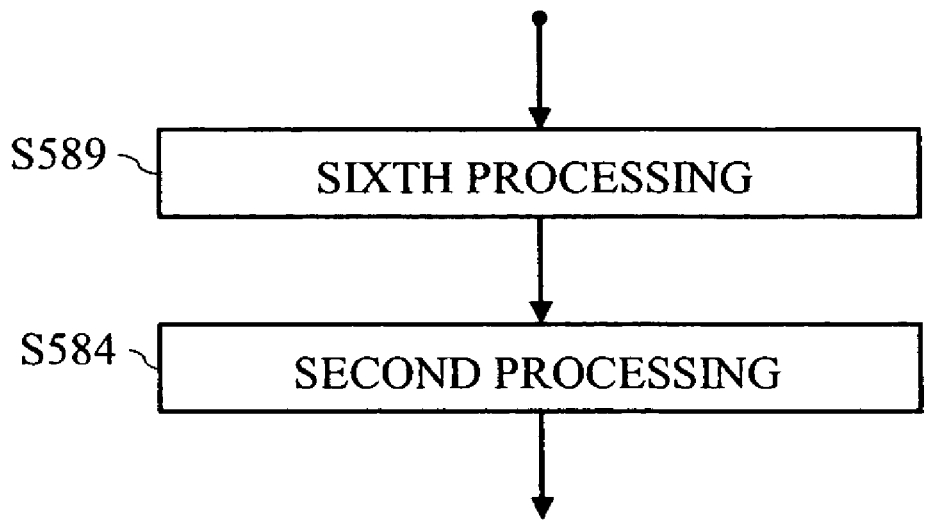
FIG. 12 is a flowchart of the function block communication API 6.

FIG. 12 is a flowchart of the function block communication API 6.

The function block communication API 6 sets the cycle time as an argument.

In the sixth process (step S589), to the command identifier memory 575 of the function block communication structural body 569, a command identifier corresponding to own command is stored, and to the communication parameter memory A 576*a*, the power budget value is stored respectively, and the second process (step S585) is performed.

Figure 13:
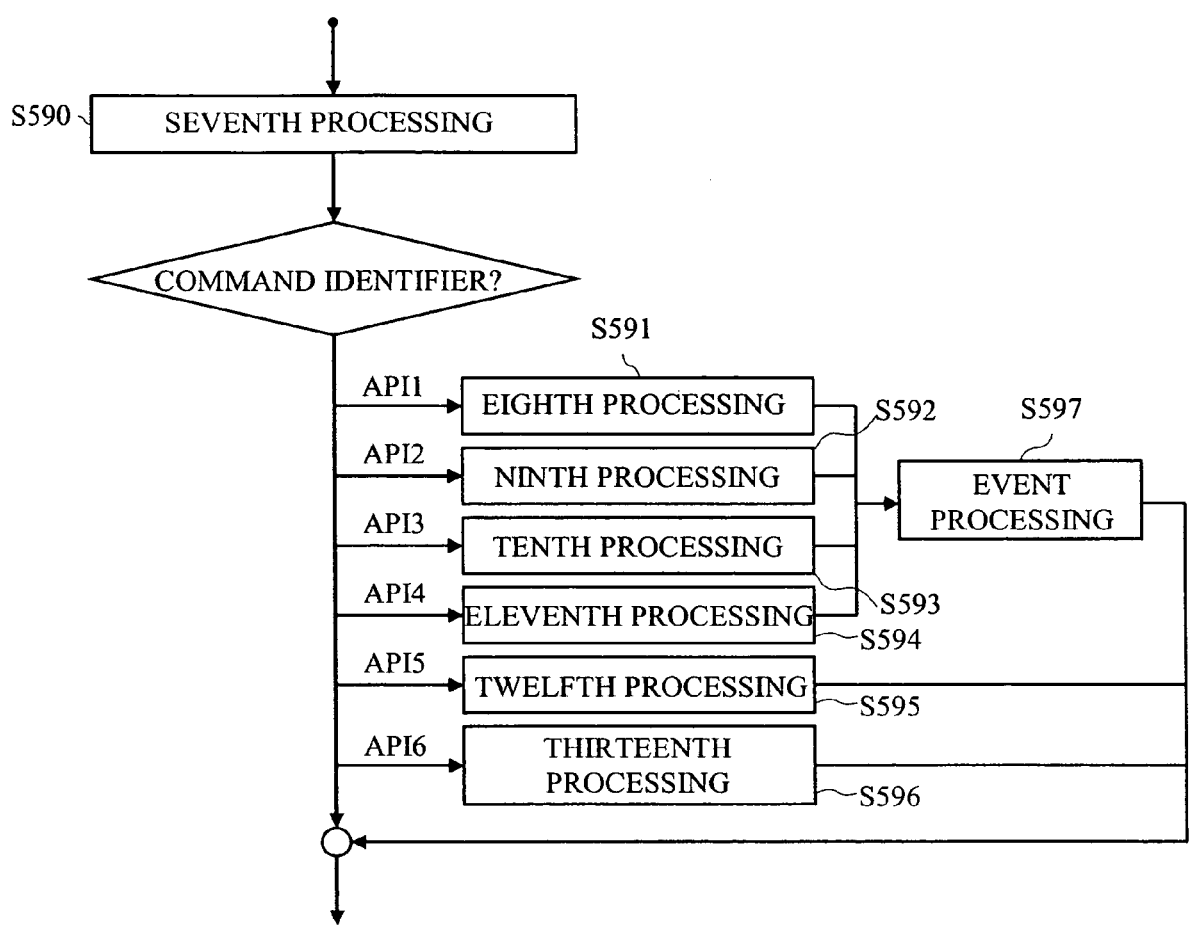
FIG. 13 is a flowchart of the function block communication software on the power consumption control unit.

FIG. 13 is a flowchart of the function block communication software on the power consumption control unit.

When an interrupt is received by the interrupt receiving unit 514 of the power consumption control unit 508, the function block communication software 557 accesses the function block communication structural body 569 via the command decoding unit 535, as the seventh process (step S590).

Next, it reads the command identifier from the command identifier memory 575 of the function block communication structural body 569, and selects the process corresponding to a desired function block communication API 565 from the eighth process (step S591) through the thirteenth process (step S596).

That is, if the command identifier shows the function block communication API 1, the procedure goes to the eighth process (step S591), if it shows the function block communication API 2, the procedure goes to the ninth process (step S592), if it shows the function block communication API 3, the procedure goes to the tenth process (step S593), if it shows the function block communication API 4, the procedure goes to the eleventh process (step S594), if it shows the function block communication API 5, the procedure goes to the twelfth process (step S595), and if it shows the function block communication API 6, the procedure goes to the thirteenth process (step S596).

Figure 14:
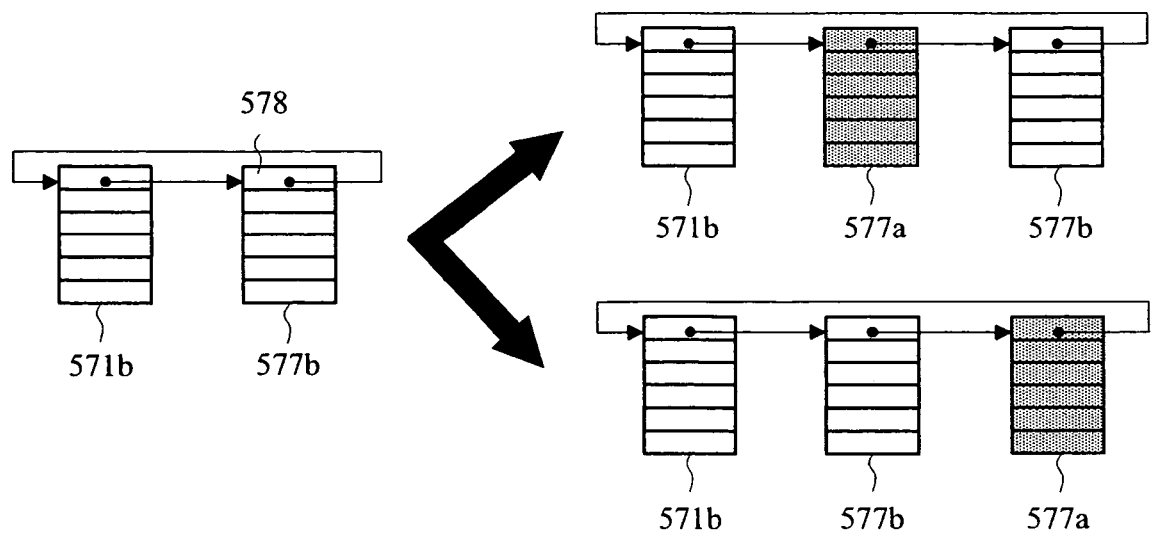
FIG. 14 is a figure for explaining the function block link list at the moment of list registration.

FIG. 14 is a figure for explaining the function block link list at the moment of list registration.

The eighth process (step S591) corresponds to the list registration unit 538.

First, the list A 577*a* is secured from the list pool 570, and the value stored in the communication parameter memory. A 576*a* of the function block communication structural body 569 is stored into the task priority memory 580 of the list A 577*a*, and the value stored in the communication parameter memory B 576*b* is stored into the function block identifier 581, and the value stored in the communication parameter memory D 576*d* is stored into the power mode value memory 582, and the value stored in the communication parameter memory E 576*e* is stored into the power mode time memory 583.

And to the function block link list controlled by the function block guard B 571*b* corresponding to the value of the function block identifier memory 581, by use of the task control pointer memory 578, the list 577 is inserted in the order of priority, and in the order of FIFO when the task priorities are same.

For example, when the list B 577*b* is connected to the function block guard B 571*b*, if the list A 577*a* is higher than the task priority of the list B 577*b* as the head list, it is inserted after the function block guard B 571*b*, on the contrary, if it is lower, and in the case of the same task priority, it is inserted and linked after the list B 577*b* as the tail list.

Figure 15:
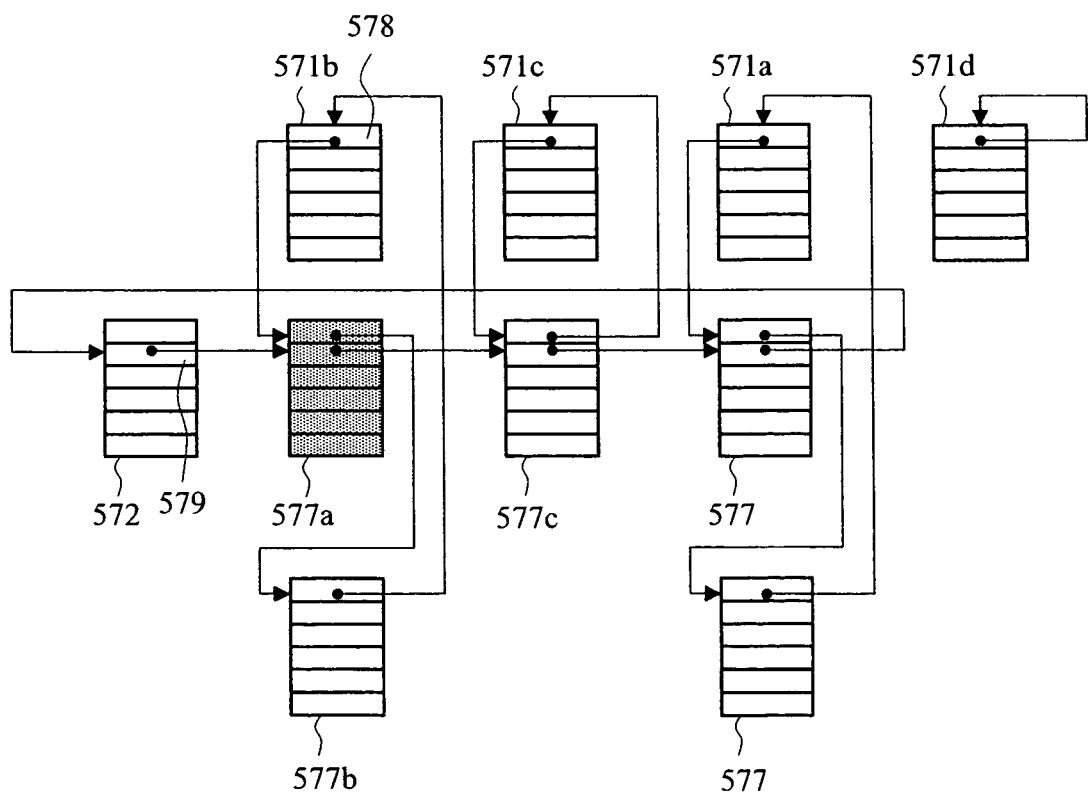
FIG. 15 is a figure for explaining the function block link list and the power control link list at the moment of list registration.

FIG. 15 is a figure for explaining the function block link list and the power control link list at the moment of list registration.

In the eighth process (step S591), after the list A 577*a* is inserted into the function block link list, and the list A 577*a* is inserted into the power control link list controlled by the power control guard 572 by use of the power control pointer memory 579 in order of lower priority, and in the order of FIFO when the task priorities are same.

After the list A 577*a* is inserted into the function block link list and the power control link list, the start event 552 is made to the event processing unit 541 and the eighth process (S591) is completed.

Further, the ninth process (step S592) is the same list registration process as the eighth process (step S591).

Figure 16:
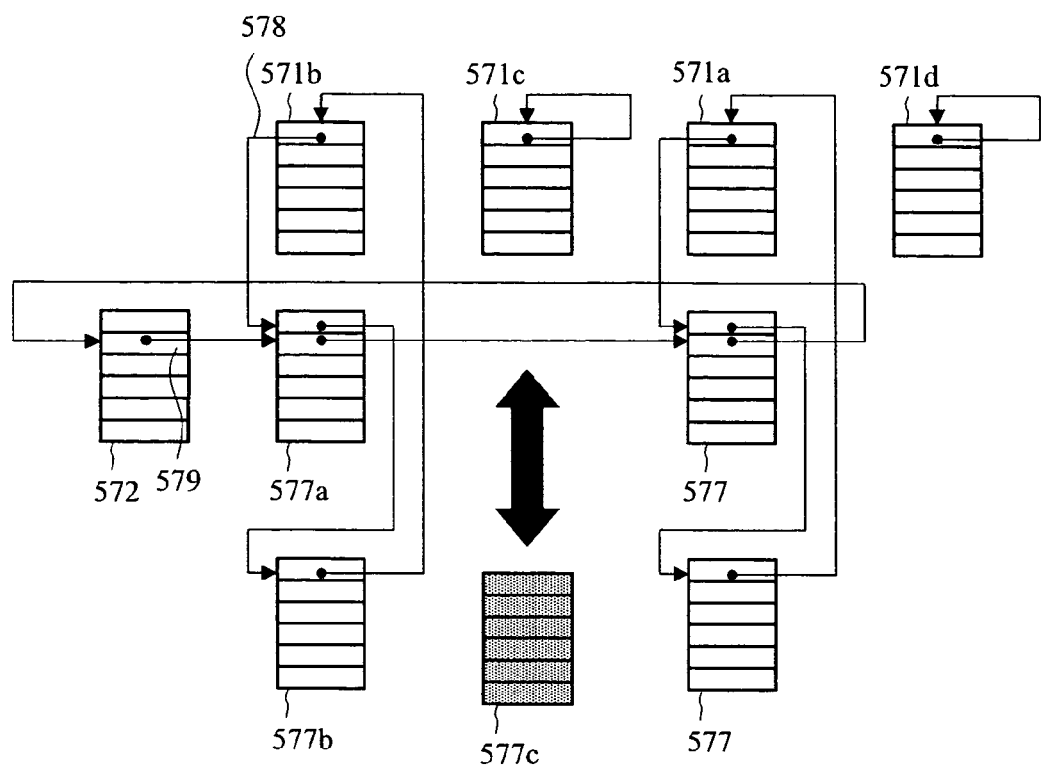
FIG. 16 is a figure for explaining the function block link list and the power control link list at the moment of list deletion.

FIG. 16 is a figure for explaining the function block link list and the power control link list at the moment of list deletion.

The tenth process (step S593) corresponds to the list deletion unit 539.

First, the task control pointer memory 578 of the list C 577c of the head of the function block link list controlled by the function block guard C 571c corresponding to the function block identifier as the value of the communication parameter memory A 576a of the function block communication structural body 569 is removed.

Next, the power control pointer memory 579 of the list C 577c corresponding to the value stored in the function block identifier memory 581 of the removed list C 577c is removed from the power control link list, and the list C 577c is returned to the list pool 570.

Figure 17:
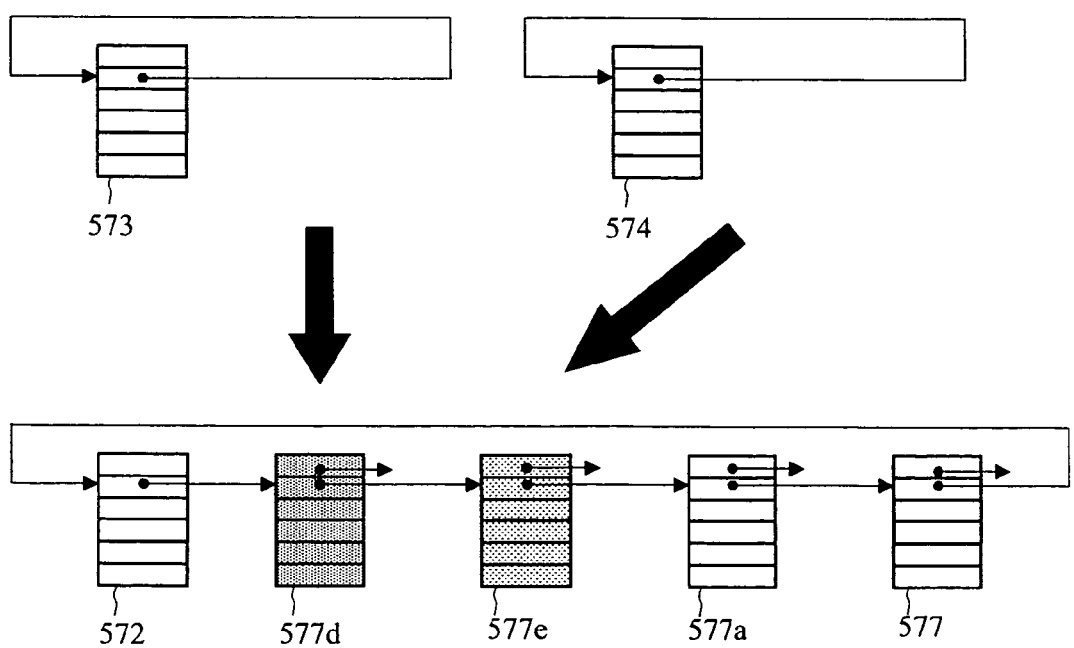
FIG. 17 is a figure for explaining power control, suspending, low power link lists at the moment of list deletion.

FIG. 17 is a figure for explaining power control, suspending, low power link lists at the moment of list deletion.

In the tenth process (step S593), next, when there exists the head list in the suspending link list controlled by the suspending guard 573 and the low power link list controlled by the low power guard 574, that is, when the list D 577d is liked to the suspending guard 573, or the list E 577e is linked to the low power guard 574, the task control pointer memory 578 of the list D577d is removed from the suspending link list. In the same manner, from the low power link list, the task control pointer memory 578 of the list E 577e is removed.

On the contrary, when there does not exist the linked list 577, nothing is performed.

Finally, the power setting API 2, and further the power setting API 1 are called out, and the function block 502 corresponding to the function block identifier memory 581 of the removed list D 577d and list E 577e is set by the operation clock distribution unit 504 to the high power mode, that is, the maximum operation frequency.

The eleventh process (step S594) becomes the list deletion process same as the tenth process (step S593).

The twelfth process (step S595) corresponds to the power budget value acquisition unit 540.

The power budget value as the value of the communication parameter memory A 576a of the function block communication structural body 569 is stored into the power budget value register 546.

In the thirteenth process (step S596), the cycle time as the value of the communication parameter memory A 576a of the function block communication structural body 569 is set by use of the system call X 561x of the time control function of the OS_X 553x.

The event process (step S597) is realized by the power control thread 566. That is, the start of the event process S597 corresponds to the start of the power control thread 566.

The power control thread 569 first calls out the power setting API 4 corresponding to the total required power value acquisition unit 545, and loads the total required power value.

Next, the total required power value is subtracted from the power budget value stored in the power budget value register 546, if the result is positive or zero, execution is shifted to the power normal processing unit 549, and if it is negative, execution is shifted to the power abnormal processing unit 550.

The power normal processing unit 549 loads the communication mode value as the value of the communication parameter memory C 576c of the function block communication structural body 569 and the function block identifier as the value of the communication parameter memory B 576b.

If the communication mode value is set as sync, an interrupt is made to the function block 502 corresponding to the function block identifier by the interrupt generation unit 536.

Figure 18:
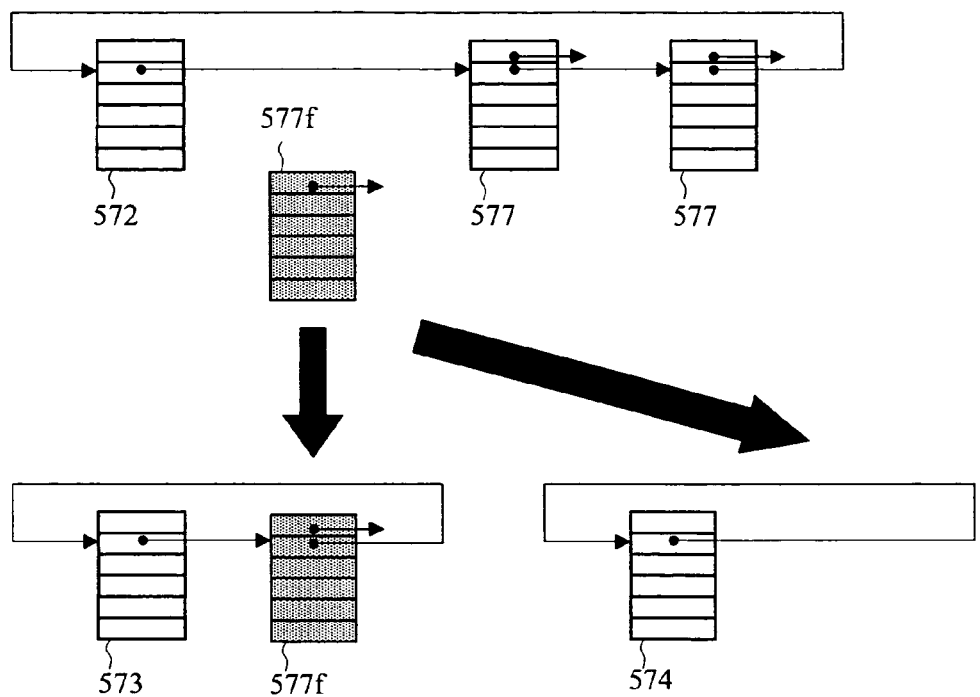
FIG. 18 is a figure for explaining the power abnormal processing unit.

FIG. 18 is a figure for explaining the power abnormal processing unit.

The power abnormal processing unit 550 first removes the head list F 577f from the power control pointer memory 579 of the power control link list.

Then it set the power mode time as the value of the power mode time memory time memory 583 of the list F 577f as the alarm time by the system call X 561 to the alarm function of the OS_X 553x.

Further, if the power mode value memory 582 of the removed list F 577f is in the stop mode, after inserting into the suspending link list in the order of high task priority, it calls out the power setting API 2, and shuts down the operation clock 529 to the function block corresponding to the value of the function block identifier memory 581 of the inserted list F 577f.

When the power mode value memory 582 is in the low power mode, after inserting it into the low power link list and linked in the order of high task priority, it calls out the power setting API 1, and makes low the operation frequency of the function clock 529 corresponding to the function block 502 corresponding to the function block identifier memory 581 of the inserted list F 577f.

Further, after lapse of the alarm time, by the alarm event, the head list linked directly to the suspending guard 573 and the low power guard 574 is removed from the power control pointer memory 579.

And the power setting API 2, and further the power setting API 1 are called out, and the function block 502 corresponding to the function block identifier memory 581 of the removed list 577 is set by the operation clock distribution unit 504 to the high power mode, that is, turned to the maximum operation frequency.

Figure 19:
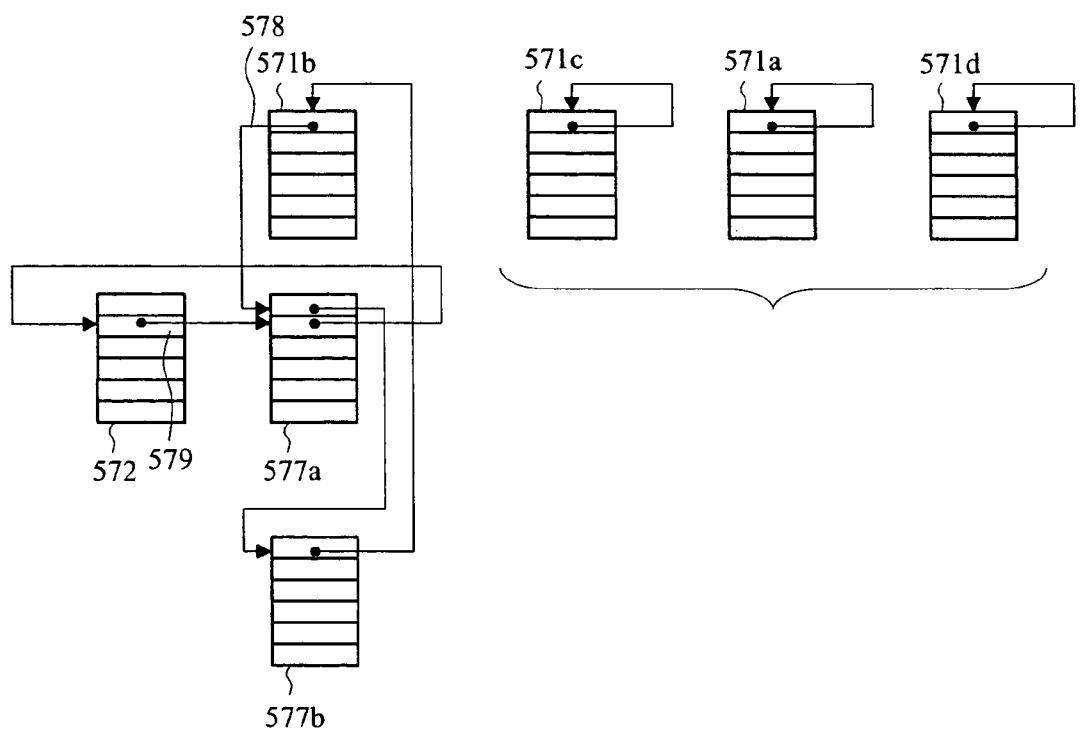
FIG. 19 is a figure for explaining the power shutdown processing unit.

FIG. 19 is a figure for explaining the power shutdown processing unit.

It is supposed that the function block A 502a, the function block C 502c, and the function block D 502d share the same power source switch 532.

First, it is detected whether the each of the function block link list A, the function block link list C, and the function block link list D is empty or not, that is, whether the head address of the own function block guard 571 is stored in the task control pointer memory 578 of the function block guard 571.

If all of the function block link list A, the function block link list C, and the function block link list D are empty, the power source switch register 533 of the power source voltage distribution unit 506 is set so as to perform low power consumption, and the power source voltage 531 is shut down by the power source 532.

On the contrary, if any of them is not empty, nothing is performed.

Of course, if an arbitrary function block link list is empty, the operation clock 529 is shut down by the operation clock distribution unit 504.

Figure 20:
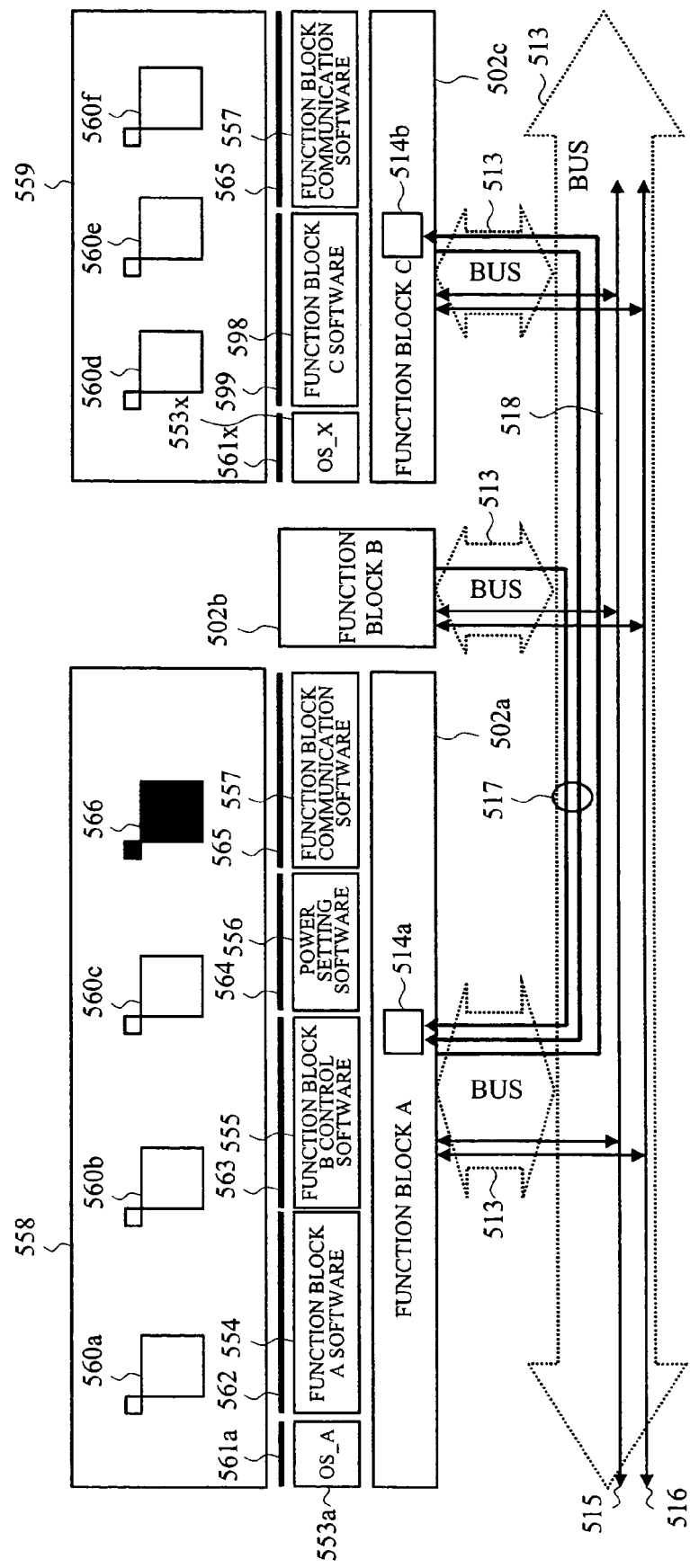
FIG. 20 is a figure for explaining a preferred embodiment wherein the power control thread is operated on the function block.
Figure 21:
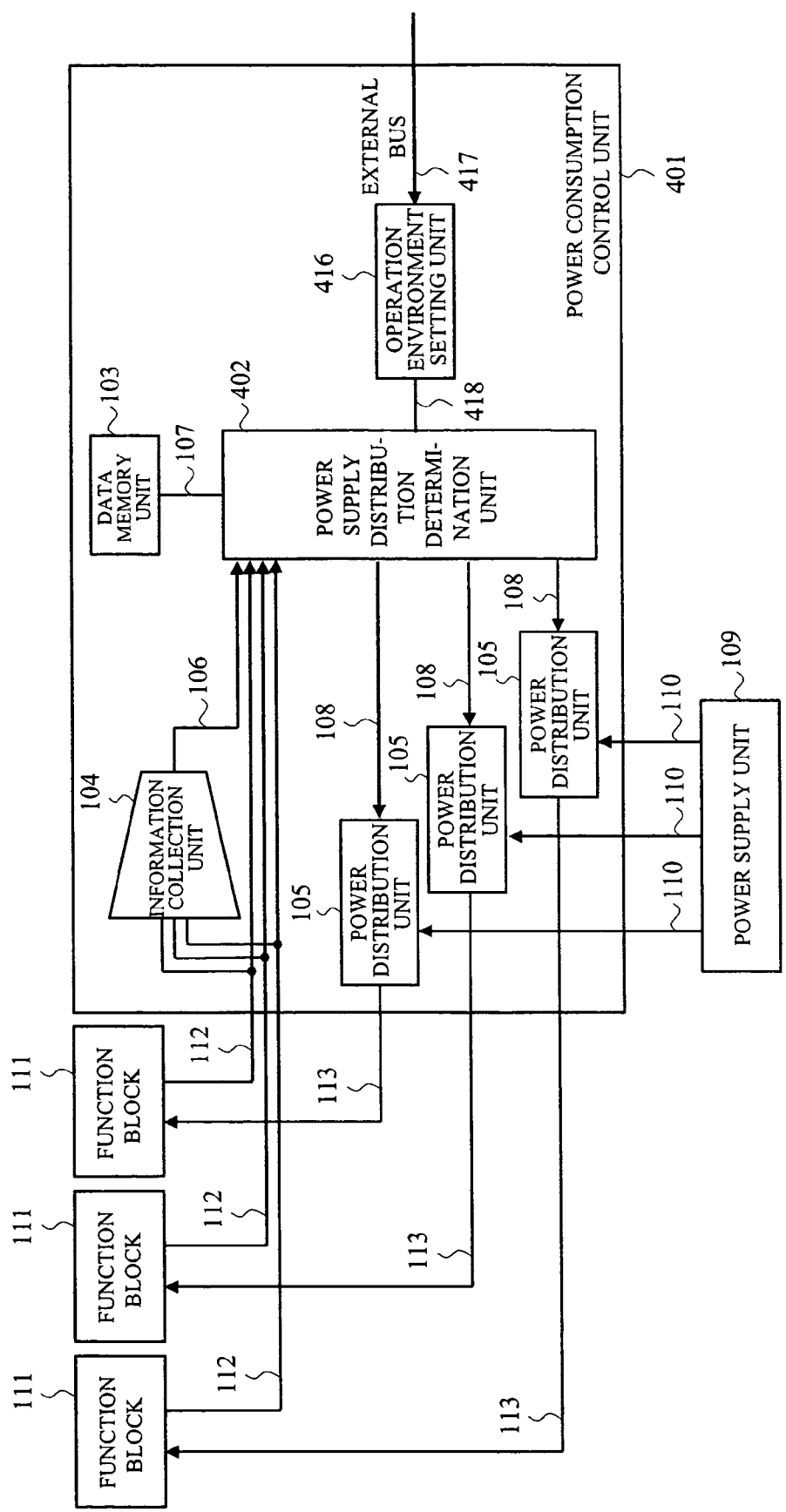
FIG. 21 is a structural diagram of a power consumption control device described in FIG. 4 of the Patent Document 1; and, FIG. 22 is a structural diagram of a power consumption control device described in FIG. 2 of the Patent Document 1.
Figure 22:
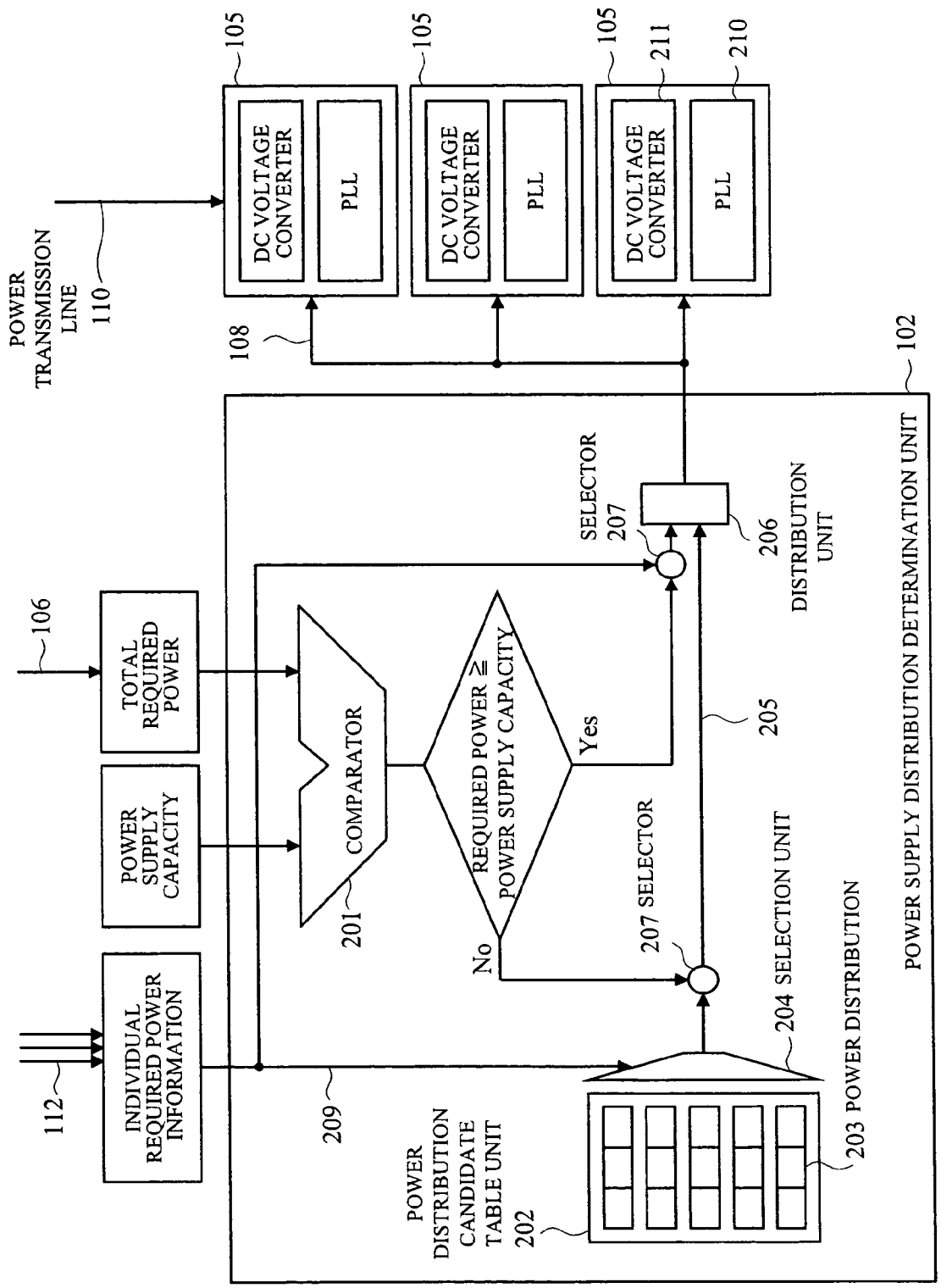

FIG. 20 is a figure for explaining a preferred embodiment wherein the power control thread is operated on the function block.

The present invention includes, as shown in FIG. 20, the power setting software 556, the function block communication software 557 and the power control thread 566, thereby can perform the power control of the same information processing device 501 as the preferred embodiment in FIG. 7. That is, when any arbitrary function block 502 has the power control thread 566, the function block functions also as the power consumption control unit 508.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is suitable for the technology for performing the power control in a semiconductor integrated circuit device, and achieving low power consumption of the semiconductor integrated circuit device through its stable actions.

What is claimed is:

1. A semiconductor integrated circuit device having a single or plural function blocks equipped with a sensor that outputs a power consumption structural element signal and a register that can set functions, a nonvolatile semiconductor memory, a volatile semiconductor memory, and a timer, the device comprising
an operation clock distribution unit that is equipped with a register that can access from all the function blocks and set power consumption, and further supplies an operation clock to all the function blocks,
a power source voltage distribution unit that is equipped with a register that can access from all the function blocks and set power consumption, and further supplies power source voltage to all the function blocks,
a power conversion unit that collects and adds all the power consumption structural element signals and converts them into a total required power value and stores it and can access from any of the function blocks and read the total required power value,
a power consumption control unit that receives a timer interrupt from the timer and loads the total required power value, and
buses that connect the function blocks and the operation clock distribution unit and the power source voltage distribution unit and the power conversion unit and the power consumption control unit and the nonvolatile semiconductor memory and the volatile semiconductor memory and the timer and can make data communications among them, wherein
the power consumption control unit,
when the power result value obtained by subtracting the total required power value from the power budget value which is the value loaded in prior and obtained by subtracting an arbitrary margin from allowable power of the power source is negative, shuts down the operation clock to the operation clock distribution unit, or decreases the operation frequency, or shuts down the power source voltage to the power source voltage distribution unit, so that the total required power value should be the power budget value or below.

2. A semiconductor integrated circuit device according to claim 1, wherein
after an execution start just after data showing that the function blocks are just after the start of execution is written into a specified shared memory of the volatile semiconductor memory, an execution start just after notification interrupt event is sent to the power consumption control unit, and the power consumption control unit receives the execution start just after notification interrupt event and reads the data from the specified shared memory and holds the data, and
after an execution start just before data showing that the function blocks are just before the start of execution is written into a specified shared memory of the volatile semiconductor memory, an execution start just before notification interrupt event is sent to the power consumption control unit, and the power consumption control unit receives the execution start just before notification interrupt event and reads the data from the specified shared memory and holds the data, and
after an execution end just after data showing that the function blocks are just after the end of execution is written into a specified shared memory of the volatile semiconductor memory, an execution completion just after notification interrupt event is sent to the power consumption control unit, and the power consumption control unit receives the execution end just after notification interrupt event and reads the data from the specified shared memory and hold the data.

3. A semiconductor integrated circuit device according to claim 2, wherein
when the function block issues a command to other single or plural function blocks, the function block that issues the command sends the execution start just after notification interrupt event, and the execution start just before notification interrupt event, and the execution end just after notification interrupt event.

4. A semiconductor integrated circuit device according to claim 3, wherein
the power consumption control unit sends to the power consumption control unit itself the execution start just after notification interrupt event, and the execution start just before notification interrupt event, and the execution end just after notification interrupt event.

5. A semiconductor integrated circuit device according to claim 4, wherein
the function blocks and the power consumption control unit send the execution start just after notification interrupt event, and the execution start just before notification interrupt event, and thereby the power consumption control unit acquires the power budget value and the total required power value.

6. A semiconductor integrated circuit device according to claim 5, wherein
the power consumption control unit,
makes a task unit a function block unit at which a thread and a process and a command are issued,
allots a function block identifier to all the function blocks,
is equipped with a function block control link list for controlling tasks to all the function blocks, is equipped with a power control link list for controlling the function blocks when the power mode is high power mode, is equipped with a low power control link list for controlling the function blocks when the power mode is low power mode, and is equipped with a suspending link list for controlling the function blocks when the power mode is stop mode,
to the lists to be inserted into the function block control link list and the power control link list and the low power control link list and the suspending link list, the task priority and the function block identifier and the power mode and power mode time for setting a holding time of the power mode are stored, and
the power control link list arranges the lists in the order of low task priority, and the function block control link list, the low power control link list, and the suspending link list arrange the lists in the order of high task priority, thereby the function blocks are scheduled.

7. A semiconductor integrated circuit device according to claim 6, wherein
the power consumption control unit performs the scheduling,
at the execution start just after notification interrupt event, the execution start just before notification interrupt event, and the execution end just after notification interrupt event, for the function block control link list, the power control link list, the low power control link list, and the suspending link list.

8. A semiconductor integrated circuit device according to claim 7, wherein the power consumption control unit is equipped with a time control unit that converts the timer event from the timer into cycle event and alarm event, and performs the scheduling at the cycle event and the alarm event, for the function block control link list, the power control link list, the low power control link list, and the suspending link list.

9. A semiconductor integrated circuit device according to claim 8, wherein the power consumption control unit, when the power result value is negative, removes the lists in the order of low task priority from the power control link list, sets the power mode time stored in the removed list to the time control unit as alarm time, when the power mode stored is the low power mode, sets the function block corresponding to the function block identifier stored to the low power mode, and inserts the removed list to the low power control link list in the order of high task priority, and on the contrary, when the power mode stored is the stop mode, sets the function block corresponding to the function block identifier stored to the stop mode, and inserts the removed list to the low power control link list in the order of high task priority.

10. A semiconductor integrated circuit device according to claim 9, wherein the power consumption control unit, after lapse of the alarm time, when the low power control link list or the suspending control link list is not empty, removes the list of the highest task priority, sets the function block corresponding to the function block identifier stored in the removed list to the high power mode, and inserts the removed list in the order of lowest task priority from the power control link list.

11. A semiconductor integrated circuit device according to claim 10, wherein the power consumption control unit, shuts down the operation clock or the power source voltage when the function block control link list is empty.

12. A semiconductor integrated circuit device according to claim 11, wherein the power consumption control unit, is a set of the function blocks whose power switches are same, and shuts down the operation clock or the power source voltage when the function block control link list corresponding to all the function blocks of the set is empty.

13. A semiconductor integrated circuit device according to claim 12, wherein the power consumption control unit, at the execution start just after notification interrupt event, newly stores the task priority, the function block identifier, the power mode, and the power time in the execution start just after data into the list, and inserts the list into the function block control link list corresponding to the function block identifier in the order of high task priority, and then inserts the list into the power control link list in the order of low task priority.

14. A semiconductor integrated circuit device according to claim 13, wherein the power consumption control unit, at the execution start just before notification interrupt event, newly stores the task priority, the function block identifier, the power mode, and the power time in the execution start just before data into the list, and inserts the list into the function block control link list corresponding to the function block identifier in the order of high task priority, and then inserts the list into the power control link list in the order of low task priority, and generates an interrupt in the function block corresponding to the function block identifier.

15. A semiconductor integrated circuit device according to claim 14, wherein the power consumption control unit, at the execution end just after notification interrupt event, removes the list of the highest task priority from the function block control link list corresponding to the function block identifier in the execution end just after data, and removes the list corresponding to the function block identifier stored in the removed list from the power control link list.

16. A power consumption control device for controlling the power consumption of a semiconductor integrated circuit device having a single or plural function blocks equipped with a sensor that outputs a power consumption structural element signal and a register that can set functions, a non-volatile semiconductor memory, a volatile semiconductor memory, and a timer, the power consumption control device, when the power result value obtained by subtracting the total required power value from the power budget value which is the value loaded in prior and obtained by subtracting an arbitrary margin from allowable power of the power source is negative, shuts down the operation clock to the operation clock distribution unit, or decreases the operation frequency.

17. A power consumption control device according to claim 16, wherein the power consumption control device, receives an execution start just after notification interrupt event issued after an execution start just after data showing that the function blocks are just after the start of execution is written into a specified shared memory of the volatile semiconductor memory, and reads the data from the specified shared memory and holds the data, receives an execution start just before notification interrupt event issued after an execution start just before data showing that the function blocks are just before the start of execution is written into a specified shared memory of the volatile semiconductor memory, and reads the data from the specified shared memory and holds the data, and receives an execution end just after notification interrupt event issued after an execution end just after data showing that the function blocks are just after the end of execution is written into a specified shared memory of the volatile semiconductor memory, and reads the data from the specified shared memory and holds the data.

* * * * *